US008810964B2

(12) United States Patent
Gao et al.

(10) Patent No.: US 8,810,964 B2
(45) Date of Patent: Aug. 19, 2014

(54) MAGNETIC RECORDING HEAD HAVING A POLE TIP SHIELD AND A POLE-SHIELD GAP REGION

(75) Inventors: Kaizhong Gao, North Oaks, MN (US); Eric Meloche, Burnsville, MN (US); Jianhua Xue, Maple Grove, MN (US); Eric S. Linville, Shakopee, MN (US); Dehua Han, Lakeville, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/823,672

(22) PCT Filed: Sep. 15, 2010

(86) PCT No.: PCT/US2010/048912
§ 371 (c)(1),
(2), (4) Date: May 23, 2013

(87) PCT Pub. No.: WO2012/036680
PCT Pub. Date: Mar. 22, 2012

(65) Prior Publication Data
US 2014/0063657 A1 Mar. 6, 2014

Related U.S. Application Data

(63) Continuation-in-part of application No. 12/404,579, filed on Mar. 16, 2009, now Pat. No. 8,279,562.

(51) Int. Cl.
*G11B 5/127* (2006.01)
(52) U.S. Cl.
USPC ........................................ 360/125.3
(58) Field of Classification Search
CPC .. G11B 5/3116; G11B 5/3163; G11B 5/3967; G11B 5/313; G11B 5/1278; G11B 5/3903; G11B 5/012; G11B 5/315

USPC .............................. 360/125.3, 125.71, 125.72
See application file for complete search history.

(56) References Cited

U.S. PATENT DOCUMENTS 5,978,176 A 11/1999 Ezaki et al.
6,414,824 B1 7/2002 Sasaki
(Continued)

FOREIGN PATENT DOCUMENTS

JP 2005310363 A 11/2005
JP 2007328898 A 12/2007
(Continued)

OTHER PUBLICATIONS

Invitation to Pay Additional Fees and, Partial International Search Report for PCT/US2010/027496 filed Mar. 16, 2010, dated Jul. 2, 2010.
(Continued)

*Primary Examiner* — Brian Miller
(74) *Attorney, Agent, or Firm* — Westman, Champlin & Koehler, P.A.

(57) ABSTRACT

A write element including a pole tip shield is disclosed. In embodiments disclosed, for example, the pole tip shield includes side shield portions fabricated of a graded magnetic moment material to form graded side shield portions having a magnetic moment that decreases in the down-track direction along a length of the side shield portions. In another embodiment, the pole tip shield includes side shield portions having a shortened length extending along a partial length of side edges of the pole tip. In illustrated embodiments, the side shield portions are formed of a contoured body having an indented portion forward of the leading edge of the pole tip. The indented portion has a rounded indented surface contour forming a rounded profile for a gap region between a leading edge portion of the pole tip shield forward of the leading edge of the pole tip.

20 Claims, 25 Drawing Sheets

(56) References Cited

U.S. PATENT DOCUMENTS

| | | | |
|---|---|---|---|
| 6,930,863 B2 | 8/2005 | Biskeborn | |
| 7,289,293 B2 | 10/2007 | Aoyagi | |
| 7,394,620 B2 | 7/2008 | Taguchi | |
| 7,441,325 B2 * | 10/2008 | Gao et al. | 29/603.16 |
| 7,872,835 B2 | 1/2011 | Guan | |
| 8,120,874 B2 | 2/2012 | Hsiao et al. | |
| 8,279,562 B2 * | 10/2012 | Gao et al. | 360/319 |
| 8,432,639 B2 * | 4/2013 | Wu et al. | 360/125.3 |
| 8,472,136 B2 * | 6/2013 | Batra et al. | 360/119.04 |
| 8,564,906 B2 * | 10/2013 | Gao et al. | 360/125.3 |
| 8,611,046 B2 * | 12/2013 | Wu et al. | 360/125.3 |
| 2001/0036044 A1 | 11/2001 | Urai | |
| 2004/0252415 A1 | 12/2004 | Shukh et al. | |
| 2005/0024766 A1 | 2/2005 | Khera et al. | |
| 2005/0141137 A1 | 6/2005 | Okada et al. | |
| 2005/0237665 A1 | 10/2005 | Guan et al. | |
| 2006/0245109 A1 | 11/2006 | Hsu et al. | |
| 2007/0035878 A1 * | 2/2007 | Guthrie et al. | 360/125 |
| 2007/0139817 A1 | 6/2007 | Hirata et al. | |
| 2007/0230044 A1 | 10/2007 | Han et al. | |
| 2007/0230046 A1 | 10/2007 | Le et al. | |
| 2007/0247749 A1 | 10/2007 | Bonhote et al. | |
| 2007/0253107 A1 | 11/2007 | Mochizuki et al. | |
| 2007/0268626 A1 | 11/2007 | Taguchi et al. | |
| 2008/0100959 A1 | 5/2008 | Feldbaum et al. | |
| 2008/0112088 A1 | 5/2008 | Hsiao et al. | |
| 2008/0180861 A1 * | 7/2008 | Maruyama et al. | 360/319 |
| 2008/0271308 A1 | 11/2008 | Hsiao et al. | |
| 2008/0273268 A1 | 11/2008 | Hsiao et al. | |
| 2008/0273277 A1 | 11/2008 | Guan et al. | |
| 2008/0297953 A1 | 12/2008 | Matono et al. | |
| 2009/0021863 A1 * | 1/2009 | Zheng | 360/125.07 |
| 2009/0027809 A1 | 1/2009 | Kamijima et al. | |
| 2009/0154021 A1 * | 6/2009 | Nunokawa et al. | 360/234.3 |
| 2009/0273863 A1 | 11/2009 | Kawano et al. | |
| 2010/0232062 A1 | 9/2010 | Gao et al. | |
| 2010/0321835 A1 * | 12/2010 | Zhang et al. | 360/319 |
| 2011/0058277 A1 * | 3/2011 | de la Fuente et al. | 360/122 |

FOREIGN PATENT DOCUMENTS

| | | |
|---|---|---|
| JP | 2008171503 A | 7/2008 |
| JP | 2008262681 A | 10/2008 |
| JP | 2009004089 A | 1/2009 |
| JP | 2009048719 A | 3/2009 |
| WO | 2012036680 A1 | 3/2012 |

OTHER PUBLICATIONS

Notification of Transmittal of the International Search Report and Written Opinion of the International Searching Authority, or the Declaration for PCT/US2010/027496 filed Mar. 16, 2010, date of mailing Nov. 8, 2010; 16 pages.

Notification of Transmittal of the International Search Report and Written Opinion of the International Searching Authority, or the Declaration for PCT/US2010/48912 filed Sep. 15, 2010, date of mailing Nov. 8, 2010, 13 pages.

Notification of Transmittal of the International Search Report and Written Opinion of the International Searching Authority, or the Declaration for PCT/US2010/027496 filed Mar. 16, 2010, date of mailing Sep. 22, 2010; 16 pages.

Notification of Transmittal of the International Preliminary Report on Patentability for International Application No. PCT/US2010/048912 filed Sep. 15, 2010, date of mailing Oct. 4, 2012.

Japanese Office Action dated Feb. 26, 2013 for Japanese Patent Application No. 2012500891.

Chinese Office Action dated Aug. 28, 2013, and English translation, from Chinese Patent Application No. 201080012751.5. (11 pages).

* cited by examiner

MAGNETIC RECORDING HEAD HAVING A POLE TIP SHIELD AND A POLE-SHIELD GAP REGION

CROSS-REFERENCE TO RELATED APPLICATION

This present application is a Section 371 National Stage Application of International Application No. PCT/US2010/048912, filed Sep. 15, 2010 and published as WO 2012/036680 on Mar. 22, 2012, in English, PCT/US2010/048912 is a continuation-in-part of U.S. Ser. No. 12/404,579, filed on Mar. 16, 2009 and issued as U.S. Pat. No. 8,279,562 on Oct. 2, 2012, the content of U.S. Ser. No. 12/404,579, issued as U.S. Pat. No. 8,279,562, is hereby incorporated by reference in its entirety.

BACKGROUND

Data storage devices store digitally encoded information or data on a magnetic storage media. Data is stored on the storage media using a magnetic recording head. Illustrative magnetic recording heads include a main pole having a pole tip and one or more auxiliary poles. A coil is energized to generate a magnetic flux path in the main pole and the one or more auxiliary poles to magnetically record data on a magnetic storage layer of the storage media. Data can be stored on the magnetic storage layer in a longitudinal or perpendicular pattern. Illustrative data storage media include rotating discs having a plurality of concentric data tracks. Heads are positioned relative to one or more of the plurality of concentric data tracks to encode the data on the magnetic storage media. Typically heads are orientated at a skew angle relative to the one or more concentric data tracks. Skew is defined as the angle between the head and a center-line of the track. A large skew angle can interfere with recording and contribute to adjacent track erasures (ATI).

Decreases in form factor size and increases in areal density can interfere with the ability to generate sufficient write field amplitude or write field gradient without ATI. The lack of sufficient write field amplitude or write field gradient affects writeablity and reliability of the recording media.

SUMMARY

The application discloses a pole tip shield including side shield portions to improve writeability and limit adjacent track interference (ATI), for example. In one embodiment, the side shield portions are fabricated of a graded magnetic moment material forming graded side shield portions. The graded side shield portions provide a magnetic moment that decreases in the down-track direction along a length of the side shield portions. In illustrated embodiments, the pole tip shield includes a leading edge portion forward of and spaced from the pole tip and graded side shield portions that extend from the leading edge portion in the down-track direction.

In other embodiments disclosed, the pole tip shield includes a leading edge portion and side shield portions having a shortened length extending along a partial length of side edges of the pole tip. The leading edge portion and side shield portions are formed of a contoured body having an indented portion forming the leading edge portion forward of the leading edge of the pole tip and the shortened side shield portions along the side edges of the pole tip. The shortened length of the side shield portions form a terminal edge surface spaced forward of the trailing edge of the pole tip. The indented portion of the pole tip shield has a rounded indented surface contour to form a rounded profile for a gap region forward of the leading edge of the pole tip.

One or more embodiments of the pole tip shields disclosed enhance or optimize the write contour bubble to reduce ATI, for example. Illustrative embodiments provide a pole tip shield that limits magnetic flux leakage and the loss of effective write field and field gradient to enhance writeability of the recording head. The claimed subject matter is not limited to implementations that provide advantages or that solve any or all of the problems discussed in the Background section of the application.

DESCRIPTION OF ILLUSTRATIVE EMBODIMENTS

Figure 1:
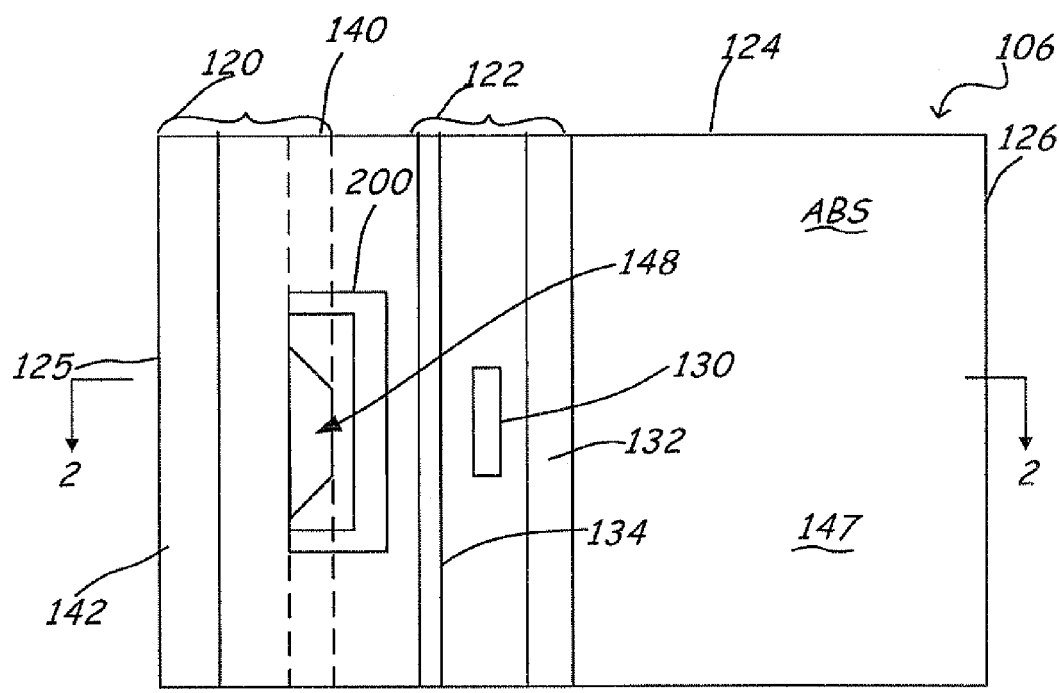
FIG. 1 is a plan view of one embodiment of a recording head illustrating a bearing surface of the head, which faces the storage media or disc surface according to an embodiment.
Figure 2:
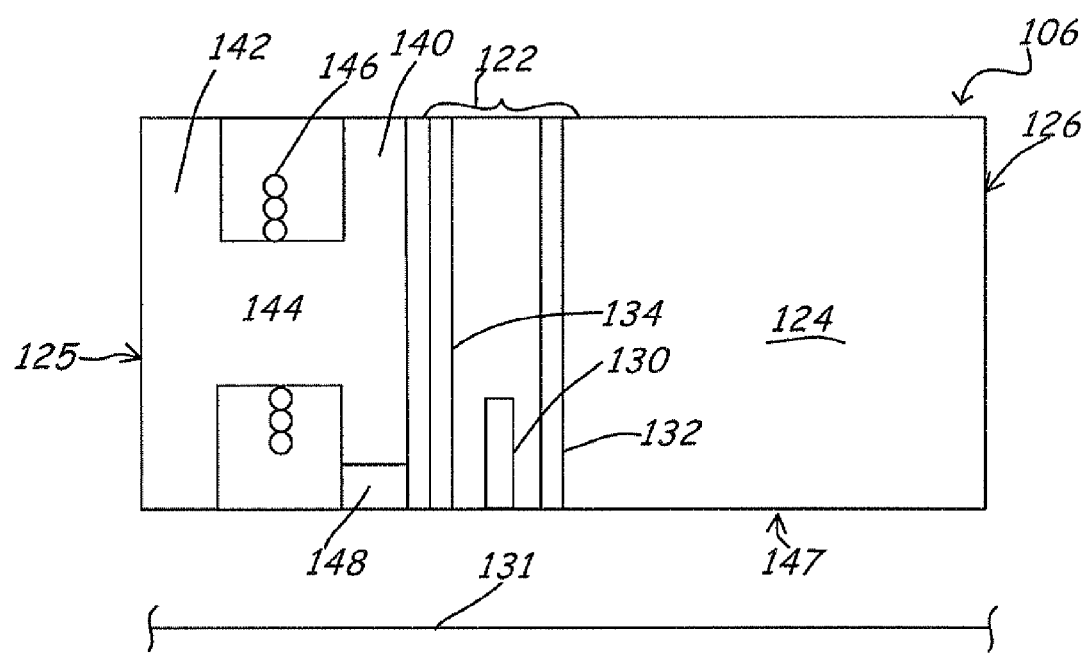
FIG. 2 is a cross-sectional view of the recording head as taken along line 2-2 of FIG. 1 according to an embodiment.

FIGS. 1-2 illustrate an embodiment of a magnetic recording head 106 to write or read data. In the illustrated embodiment, the head 106 includes a write element 120 and a read element 122 formed on a substrate or slider body 124, for example, using thin film deposition techniques. As shown, the write element 120 is fabricated proximate to a trailing edge 125 of the head or slider body spaced from a leading edge 126 of the head and slider body 124. In the illustrated embodiment, the read element 122 includes a sensor 130 that is configured to read magnetically encoded data from a data storage media or disc 131 (shown in FIG. 2). The sensor 130 is disposed between shields 132, 134 to isolate the sensor 130 from external magnetic fields that might interfere with read operations. Illustrative sensor elements 130 include magnetoresistive, giant magnetoresistive (GMR), tunneling magnetoresistive (TMR) or other sensors which, read magnetically encoded data.

As shown, the write element 120 includes a main pole 140 and an auxiliary pole 142. The main pole 140 and auxiliary pole 142 are magnetically connected via yoke portion 144 (shown in FIG. 2) to form a magnetic flux path. A conductive coil 146 is wound about the yoke portion 144 to induce a magnetic flux in the main pole 140 and the auxiliary pole 142. An insulating material fills a gap or area between the main pole 140 and auxiliary pole 142 and surrounds the conductive coil 146 to electrically insulate the conductive coil 146 from the main and auxiliary poles 140, 142. Embodiments disclosed herein include a pole tip shield 200 as shown in FIG. 1 and as described more fully herein.

Figure 3A:
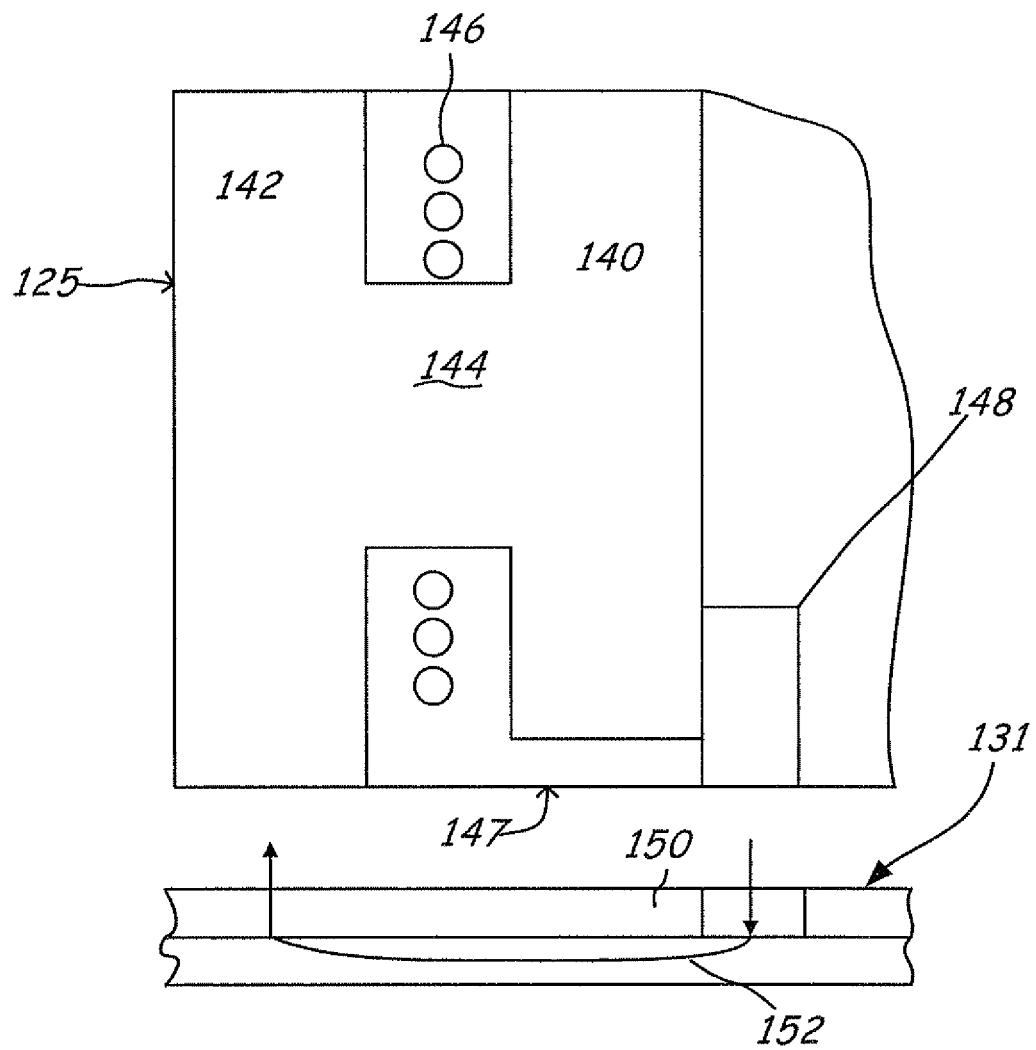
FIGS. 3A-3C schematically illustrate embodiments of a write element of a recording head for encoding data according to an embodiment.
Figure 3B:
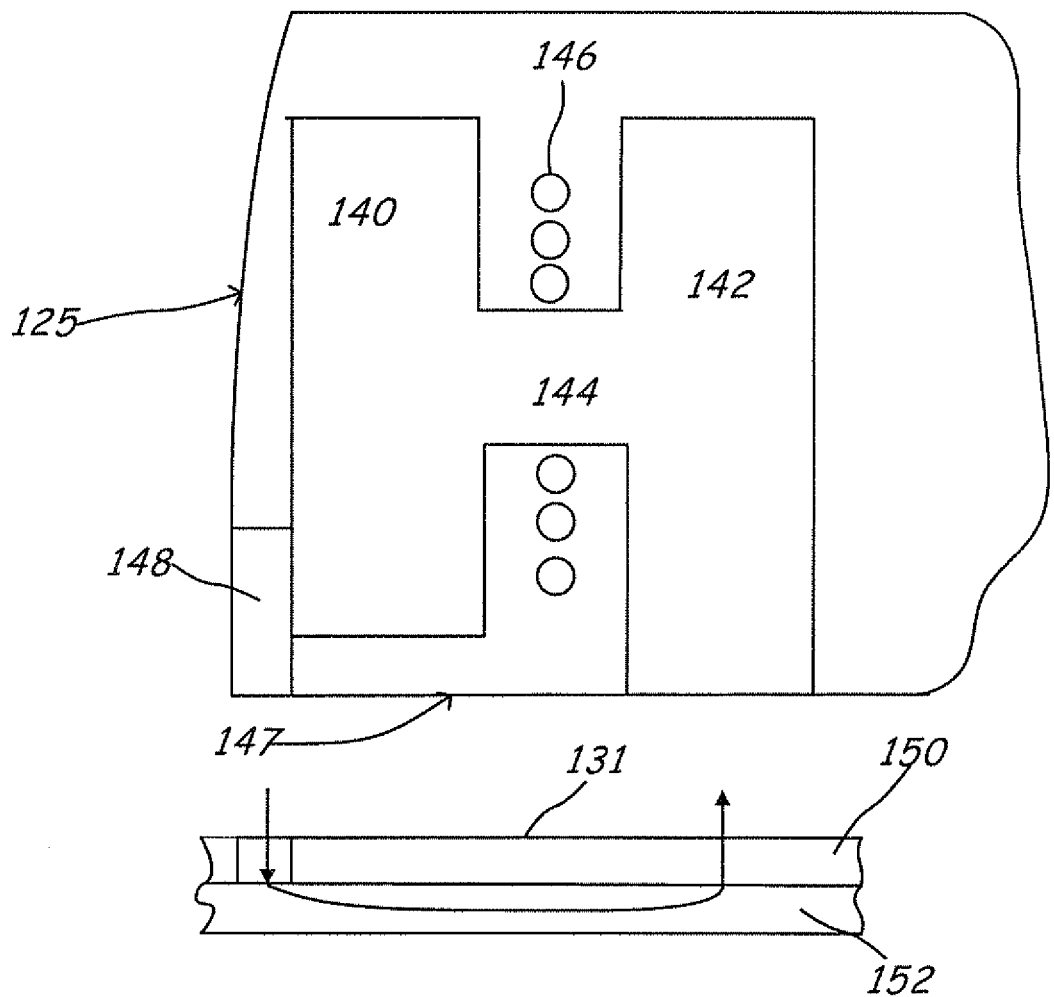

In the illustrated embodiment, the write element 120 and read element 122 are formed along an air bearing surface 147 of the head which faces a surface of the data storage media or disc. In an illustrated embodiment, rotation of the disc creates an air flow path along the air bearing surface 147 of the head. Air flows along the air bearing surface 147 from the leading edge 126 to the trailing edge 125 of the head. For proximity or near proximity recording, the air flow along the air bearing surface 147 is pressurized to provide a lifting force so that the head "floats" above the data storage media or disc 102. In illustrated embodiments, the air bearing surface 147 of the head is patterned using known etching processes to provide an optimum pressure profile and pitch for read and/or write operations. As shown in FIGS. 1-2, the main pole 140 has a pole tip 148 along the air bearing surface 147 of the head. Pole tip 148 can be an extension of the main pole 140 (as shown in FIG. 1) or a separate connected element located on either the leading side of the main pole 140 (as shown in FIG. 3A) or the trailing side (as shown in FIG. 3B). Typically, read and write elements 120, 122 are deposited on a wafer and the wafer is sliced to form the etched surfaces of the air bearing surface 147 of the head.

FIGS. 3A-3B are side cross-sectional views illustrating different write element embodiments or structures configured to record or write data to the magnetic storage media or disc 131. In each of the embodiments, the data storage media includes a magnetic recording layer 150 and a magnetic backing layer 152, although application is not limited to the particular storage media shown. For example, in another embodiment, a non-magnetic layer is interposed between the magnetic recording layer 150 and the magnetic backing layer 152. Embodiments disclosed in the application can also be used with an exchange coupled composite (ECC) media. In the illustrated embodiment, coil 146 is energized to induce the magnetic flux. The direction of the current in the coil 146 is reversed to change the direction of the magnetic flux path to record data bits in up and down orientations to perpendicularly encode data on the disc or storage media.

Figure 3C:
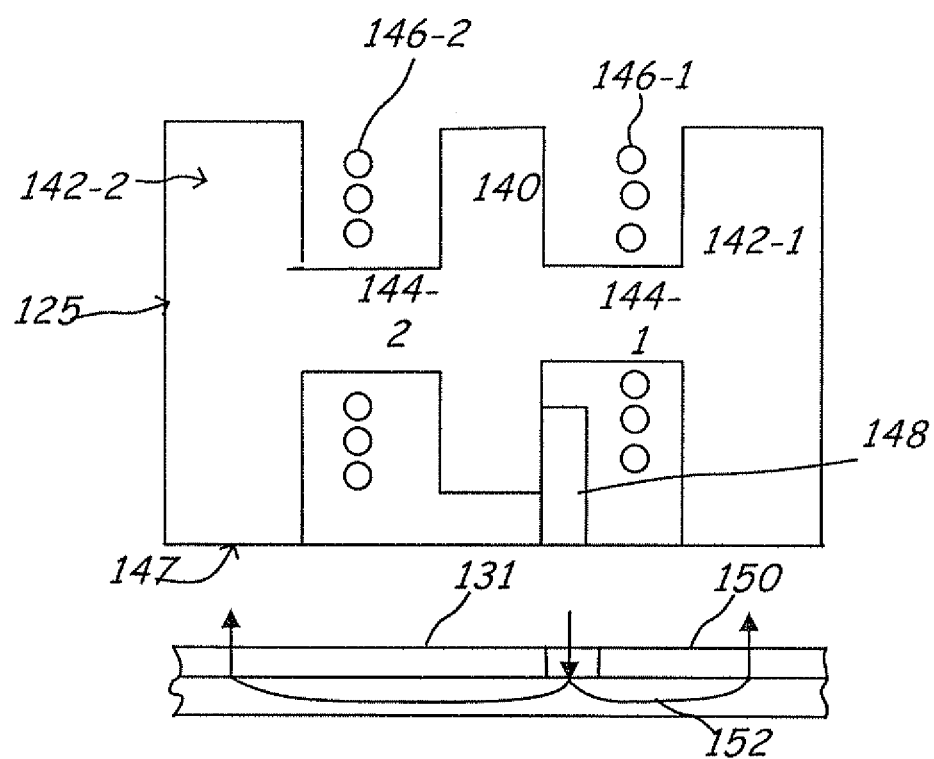

In the illustrated embodiment shown in FIG. 3A, the write element includes main pole 140 having a pole tip 148 and an auxiliary pole 142 spaced from the pole tip 148 in the trailing edge direction. When the coil 146 is energized, a flux path or circuit is formed as shown to perpendicularly record data on the magnetic recording layer 150. In an alternate embodiment shown in FIG. 3B, the pole tip 148 is positioned proximate to the trailing edge of the head 106 and the auxiliary pole 142 is spaced from the pole tip 148 in a direction towards the leading edge. FIG. 3C illustrates another embodiment of a magnetic recording head where the write element includes multiple auxiliary poles 142-1, 142-2. Coils 146-1, 146-2 are wound about yokes 144-1, 144-2 connecting the auxiliary poles 142-1, 142-2 to the main pole 140. The coils 146-1, 146-2 are energized to provide multiple flux paths as shown to record data to the magnetic recording layer 150 of the data storage media.

Figure 4:
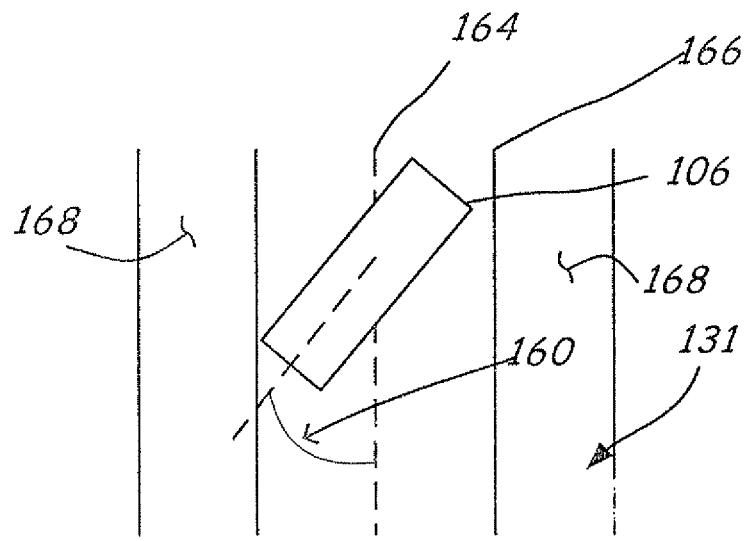
FIG. 4 is a schematic illustration of an orientation of a head relative to a data track on a magnetic storage media according to an embodiment.
Figure 5:
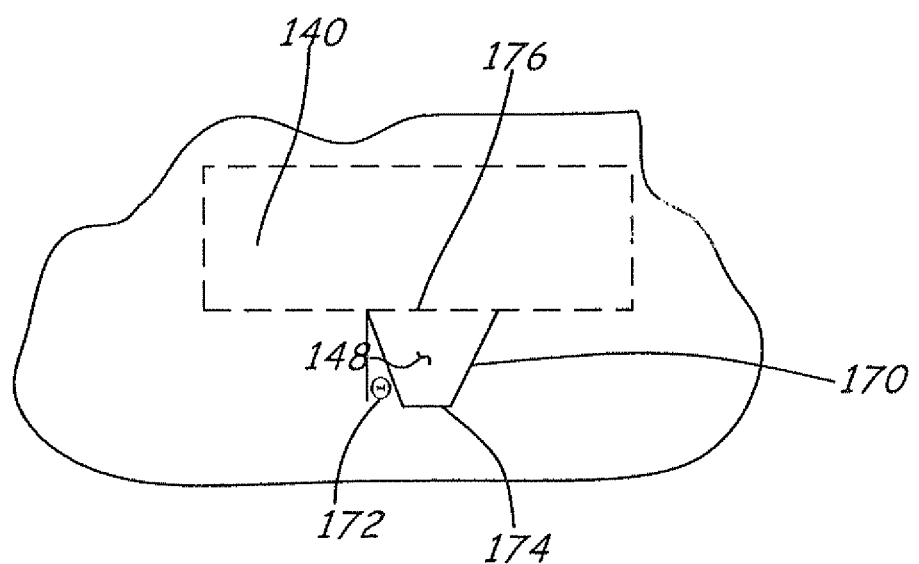
FIG. 5 schematically illustrates an embodiment of a pole tip having a wall angle to compensate for skew of the head relative to data tracks on the magnetic storage media according to an embodiment.

The head 106 is positioned relative to select data tracks via a positioning or actuation device. As schematically illustrated in FIG. 4, the head is positioned on the media such that there is a skew angle 160 between the head and a center-line 164 of the track 166. Since the orientation of the head (and write element) is offset at a skew angle 160 (exaggerated for clarity—in this example of approximately 15 degrees) relative to the center-line 164 of track 166, the write element can interfere with data recorded in adjacent tracks 168. As shown in FIG. 5, the main pole tip 148 (of the main pole 140) has a pole tip surface facing the disc or media surface 131. In prior designs, the pole tip surface has a trapezoidal shape 170 to provide a wall angle 172 between a leading edge 174 and trailing edge 176 of pole tip 148. The wall angle 172 provides a narrow width profile at the leading edge of the pole tip and a wider profile at the trailing edge to reduce adjacent track interference (ATI) in a cross track direction proximate to the leading edge 174 of the pole tip 148.

Figure 6A:
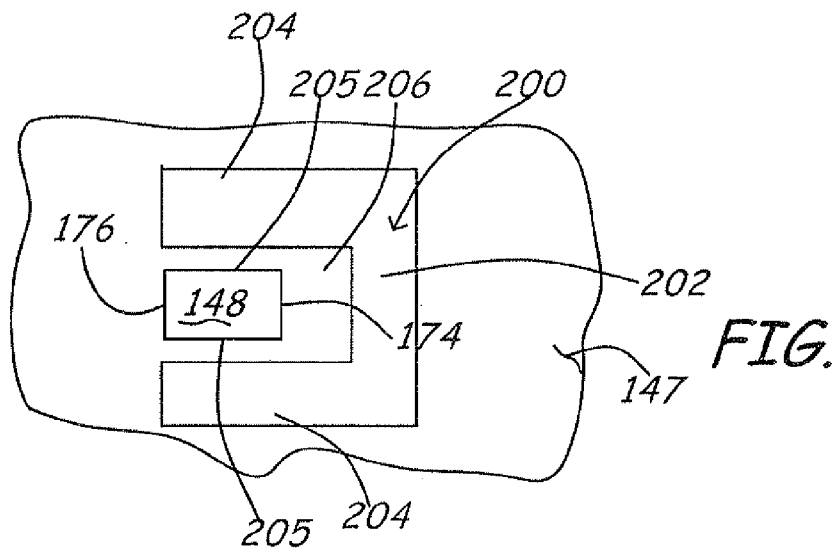
FIGS. 6A-6C schematically illustrate embodiments of a pole tip shield for a pole tip of a write element according to an embodiment.
Figure 6B:
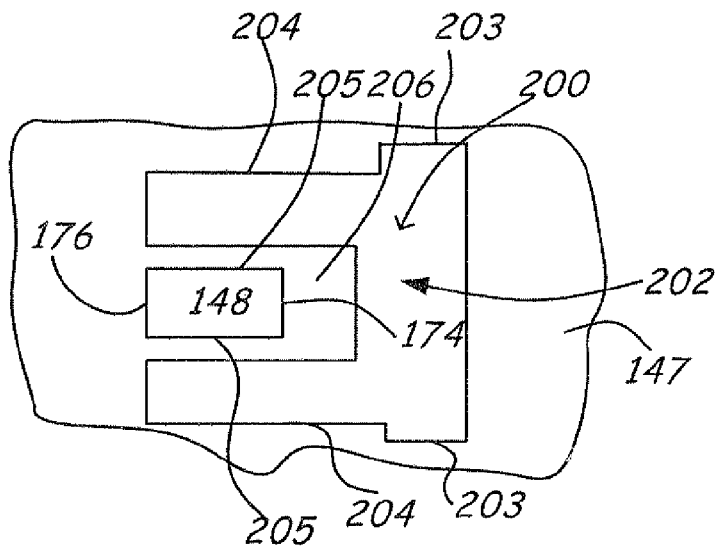
Figure 6C:
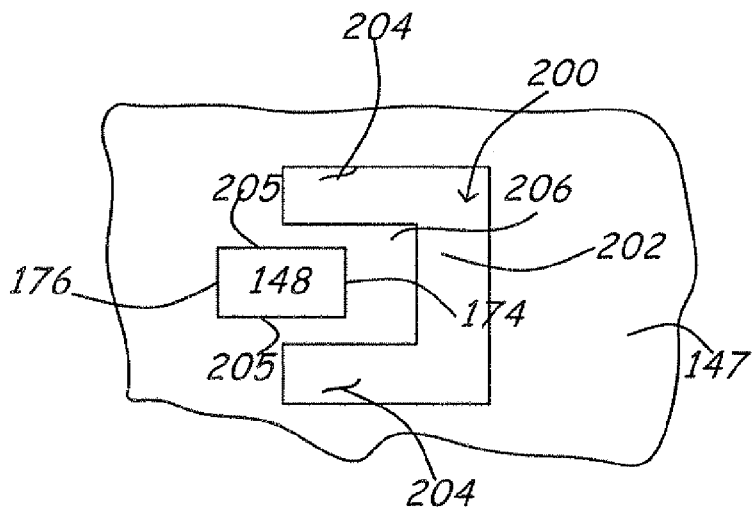

FIGS. 6A-6C illustrate embodiments of a pole tip shield 200 having application for a write element of a recording head as viewed from the air bearing surface 147 of the head facing the media or disc. In the illustrated embodiments, the pole tip shield 200 is generally "U" shaped and includes a leading edge shield portion 202 forward of the leading edge 174 of the main pole tip 148 and side portions 204 that extend along sides 205 of the main pole tip 148. In an illustrated embodiment, the main pole tip 148 comprises a ferromagnetic material, such as, but not limited to, iron (Fe), cobalt (Co), and combinations thereof, such as, iron cobalt ($Co_xFe_y$, (where x≅20-45% and y≅55-80%)), iron nickel ($Fe_yNi_x$ (where x≅55-95% and y≅5-45%)), cobalt iron nickel ($Co_xFe_yNi_z$ (where x≅15-55%, y≅10-80%, and z≅5-35%)) or other ferromagnetic materials. In addition, the write pole tip can be also in a laminated structure or made of only one alloy of those mentioned above.

The pole tip shield 200 in some embodiments is also formed of a ferromagnetic material such iron cobalt ($Co_xFe_y$, (where x≅20-45% and y≅55-80%)), iron nickel ($Fe_yNi_x$ (where x≅55-95% and y≅5-45%)), or cobalt iron nickel ($Co_xFe_yNi_z$ (where x≅15-55%, y≅10-80%, and z≅5-35%)). In one embodiment, both the pole tip 148 and shield 200 are formed of a high moment alloy, such as Fe60Co40. A gap area or region 206 between the shield 200 and main pole tip 148 is filled with a non-magnetic and electrically insulating material such as Alumina.

Figure 7:
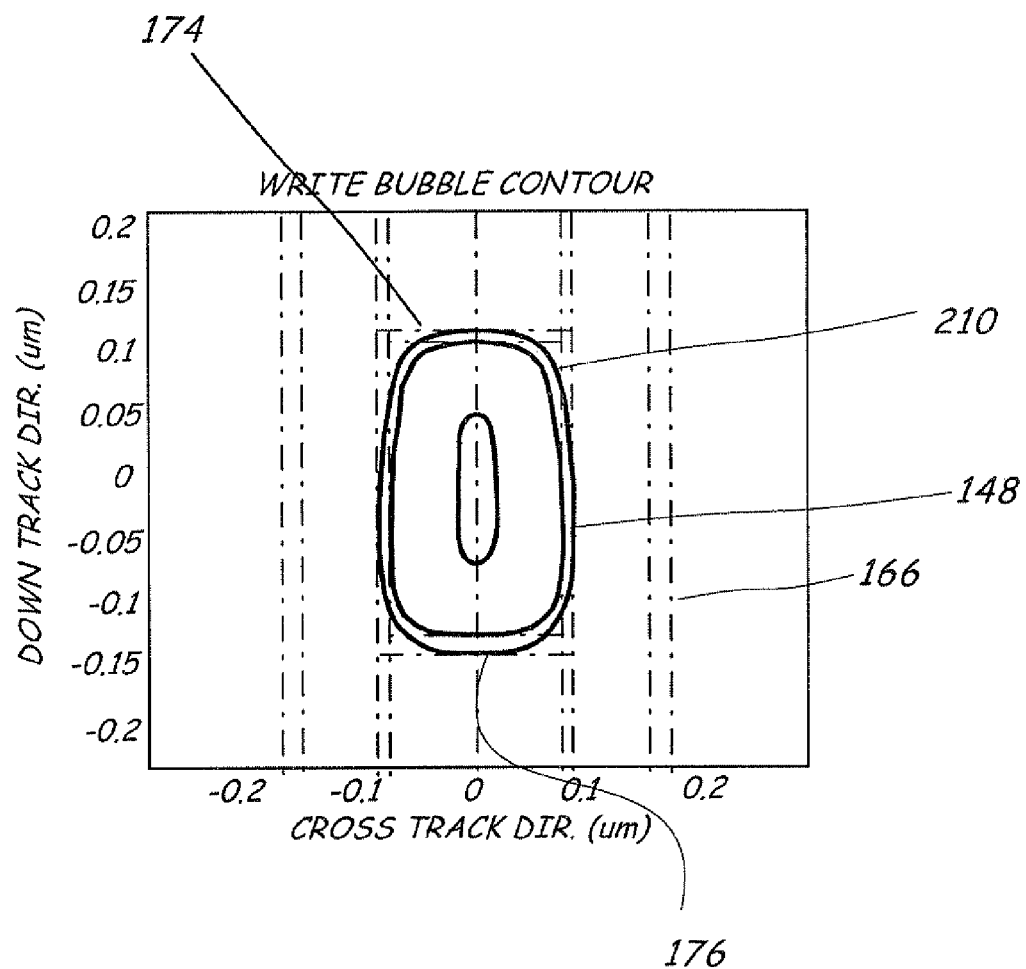
FIG. 7 schematically illustrates a magnetic field profile having a magnetic wall angle to reduce ATI according to an embodiment.

When the write pole is energized to encode data on the media, the write pole tip 148 is close to saturation. In the illustrated embodiments of FIGS. 6A-6C, part of the magnetic flux is shunted into the shield 200 so that an opposite magnetic charge accumulates on a surface of the shield 200 causing a net field decrease and field angle change proximate to the shield 200. The field angle change provides a magnetic wall angle or contour to limit or reduce ATI. The "U" pole tip shield 200 as described is configured to provide a magnetic write bubble 210 in a generally trapezoid shape as shown in FIG. 7. The trapezoidal shape of the magnetic write bubble 210 forms the magnetic wall angle to provide a narrow field width or profile proximate to the leading edge 174 to reduce ATI. The magnetic-write bubble 210 of the pole tip 148 also includes a relatively wider field width profile proximate to the trailing edge 176 with relation to track 166. As described in an illustrated embodiment, the pole tip shield 200 can be formed of different magnetic materials or compositions (including different compositions of the materials discussed above having different x, y or z percentages) to provide variable magnetic moments or properties in the shield 200 to optimize the magnetic wall angle for write operations as described herein.

In the embodiments illustrated in FIG. 6A-6B, side portions 204 of the generally "U" shaped shield 200 extend along the length of sides 205 of the pole tip 148 generally from the leading edge 174 to the trailing edge 176 of the pole tip 148. In the embodiment illustrated in FIG. 6B, the side portions 204 are recessed inward from side edges 203 of the leading edge shield portion 202 of the pole tip shield 200.

In the embodiment shown in FIG. 6C, the length of the side portions 204 of the shield 200 is shorter than the length of the sides 205 of the pole tip 148. In particular, in the embodiment shown in FIG. 6C, the side shield portions 204 of the shield 200 extend to about midlength of the pole tip 148.

In illustrated embodiments, the side portions 204 of the "U" shaped pole tip shield 200 are configured to provide a variable magnetic moment along a length of the side shield portions 204 of the shield 200. In particular, in an illustrated embodiment, the leading edge portion of the pole tip shield 200 has a larger magnetic moment than a trailing edge portion to shape the magnetic wall angle proximate to the leading edge of the pole tip 148. In an illustrated embodiment, the side portions 204 of the "U" shaped pole tip shield 200 can be formed of different magnetic materials or compositions along a length thereof to provide different magnetic moments to optimize magnetization and the write field.

Figure 8A:
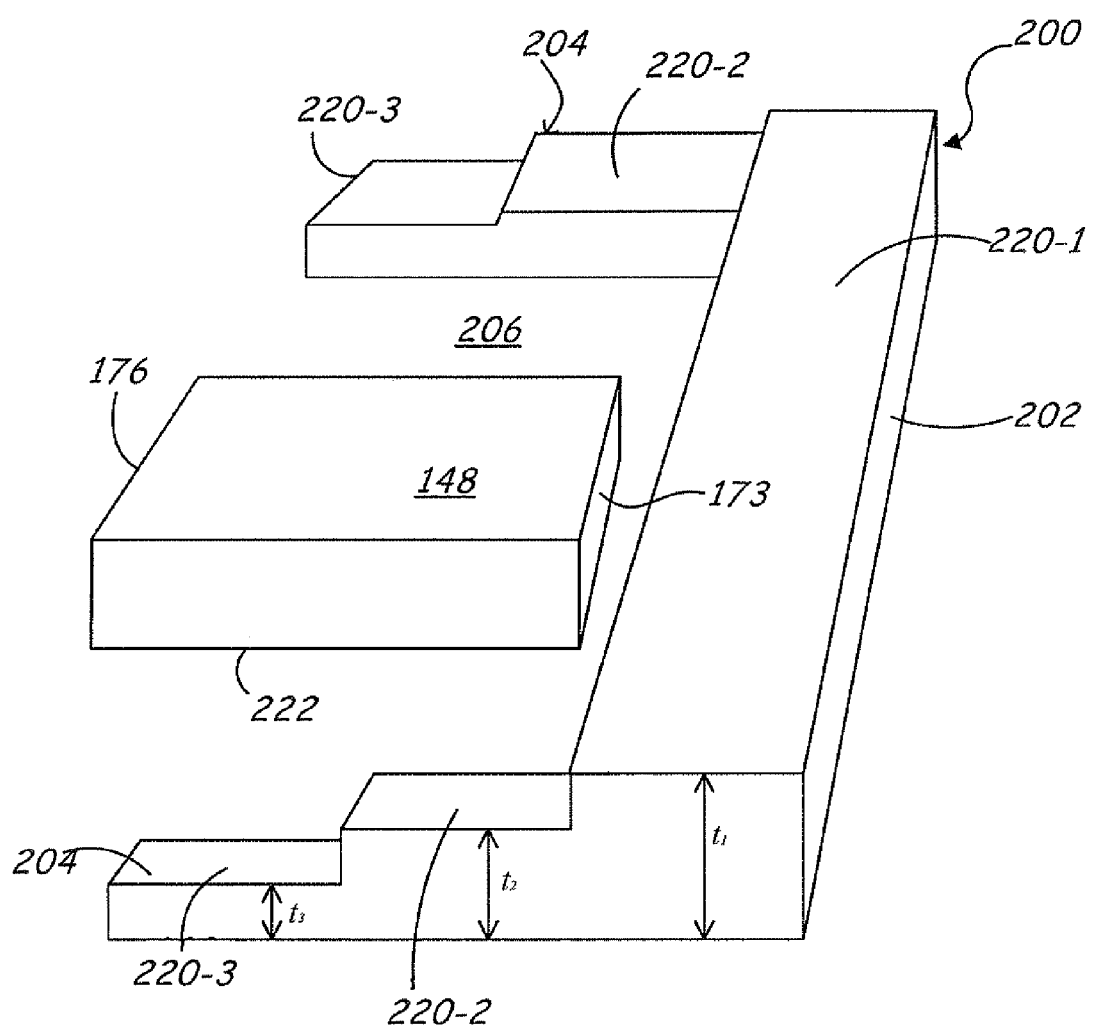
FIGS. 8A-8B schematically illustrate embodiments of a pole tip shield for a pole tip of a write element having stepped thickness segments according to an embodiment.
Figure 8B:
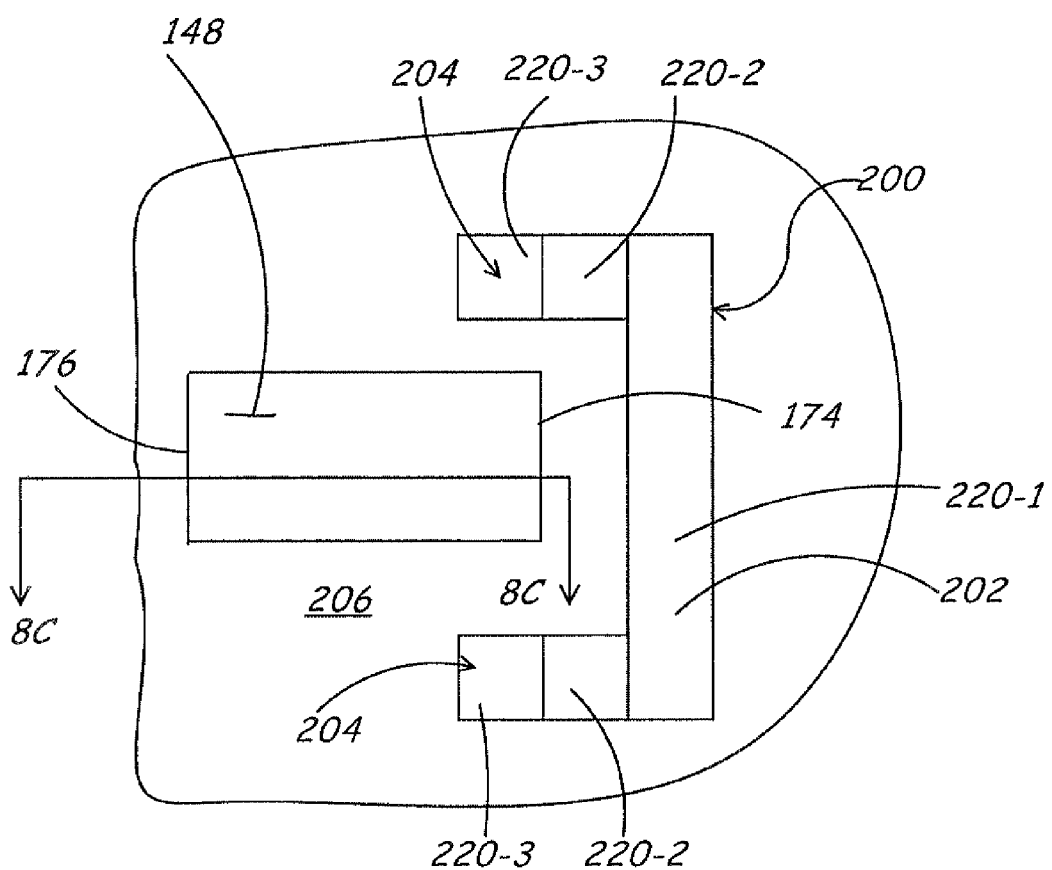

FIGS. 8A-8B illustrate embodiments of a "U" shaped pole tip shield 200 including different thickness dimensions along a length of the pole tip shield 200 to provide different magnetic moments along a length of the side portions 204 of the "U" shaped pole tip shield 200. In the embodiments shown in FIGS. 8A-8B, the different thickness dimensions are formed via stepped thickness segments. Each of the stepped thickness segments provides a different field effect or field angle change along the length of the pole tip 148. In an illustrated embodiment, the different thickness segments can be of different magnetic materials or compositions with different magnetic moments to shape the angle or dimension of the magnetic wall angle.

In the illustrated embodiments of FIGS. 8A-8B, the pole tip 148 includes a rectangular shape forming a generally planar surface 222 facing the media to provide optimum write pole tip area at the air bearing surface 147. The stepped thickness segments or different thickness dimensions optimize the magnetic field or wall angle of the rectangular shaped pole tip 148 to reduce ATI. Illustratively, the pole tip shield 200 is configured to provide a magnetic wall angle of approximately 4-5 degrees, however application is not limited to a specific wall angle dimension. In the illustrated embodiment, the rectangular pole enabled by the shield configuration greatly simplifies the writer process especially as the dimensions of the pole tip are reduced to accommodate high areal density.

Specifically, in the embodiment illustrated in FIG. 8A, the pole tip shield 200 includes a leading edge portion 202 having a first thickness segment 220-1 having a thickness dimension $t_1$. Side portions 204 of the pole tip shield 200 shown in FIG. 8A include a second thickness segment 220-2 having a second thickness dimension $t_2$ and a third thickness segment 220-3 having a third thickness dimension $t_3$, where $t_3 < t_2 < t_1$.

As shown in FIG. 8A, the larger thickness segments 220-1 and 220-2 provide a larger field angle change or effect to provide a narrow field profile proximate to the leading edge while the smaller thickness segment 220-3 provides a smaller field angle change proximate to the trailing edge. As shown in FIG. 8A, the first, second and third thickness segments 220-1, 220-2, 220-3 are separated by a thickness step, although application is not limited to the specific embodiment illustrated in FIG. 8A. In the illustrated embodiment, thickness steps are orientated so that thickness segments 220-1, 220-2, 220-3 have a common co-planar surface along the air bearing surface 147. In an alternate embodiment, the thickness steps are recessed from the air bearing surface 147. In addition to the stepped thickness segments 220-1, 220-2, 220-3 or as an alternative, in illustrated embodiments, the pole tip shield 200 includes different material segments to provide a narrow field profile proximate to the leading edge of the pole tip 148.

Figure 8C:
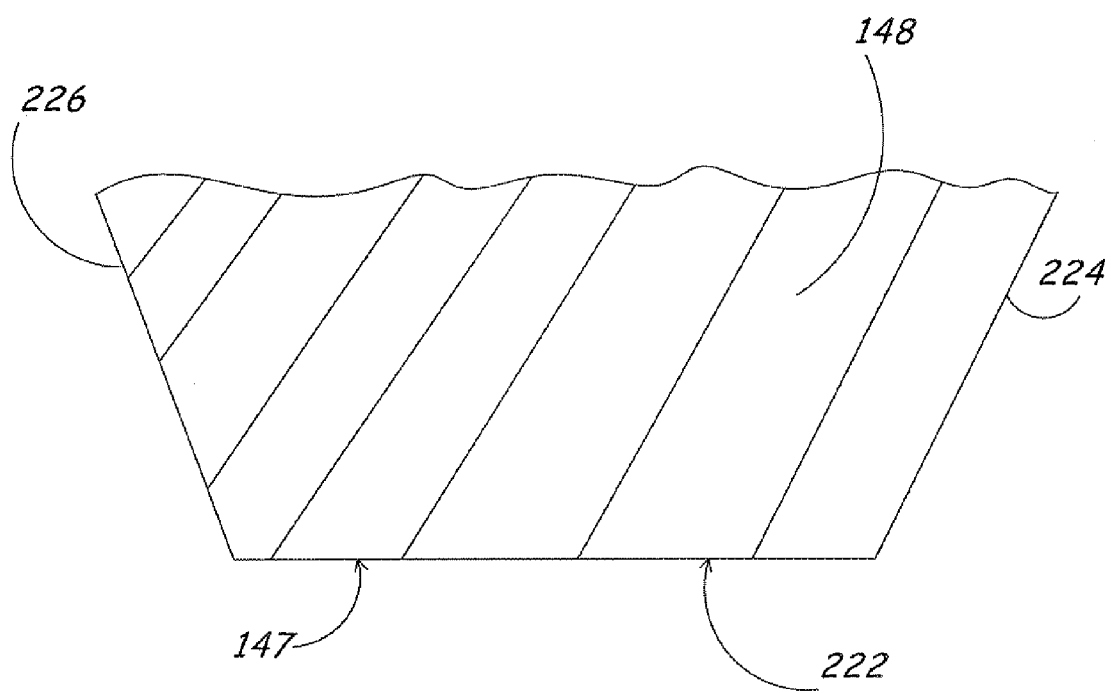
FIG. 8C is a cross-sectional view taken along line 8C-8C of FIG. 8B illustrating a profile of the pole tip according to an embodiment.

FIG. 8B illustrates a pole tip shield 200 including multiple stepped thickness segments 220-1, 220-2, 220-3 similar to the embodiment shown in FIG. 8A. In the embodiment shown in FIG. 8B, the side portions 204 include a shortened length dimension relative to the length of the pole tip 148 between the leading edge 174 and trailing edge 176. In the illustrated embodiments, the main pole tip 148 includes a generally planar surface 222 facing the disc media. As shown in FIG. 8C, the pole tip 148 includes a contoured profile providing a sloped leading edge surface 224 and a sloped trailing edge surface 226 to provide a tapered profile to the planar surface 222 of the pole tip 148 leading up to the air bearing surface 147.

Figure 8D:
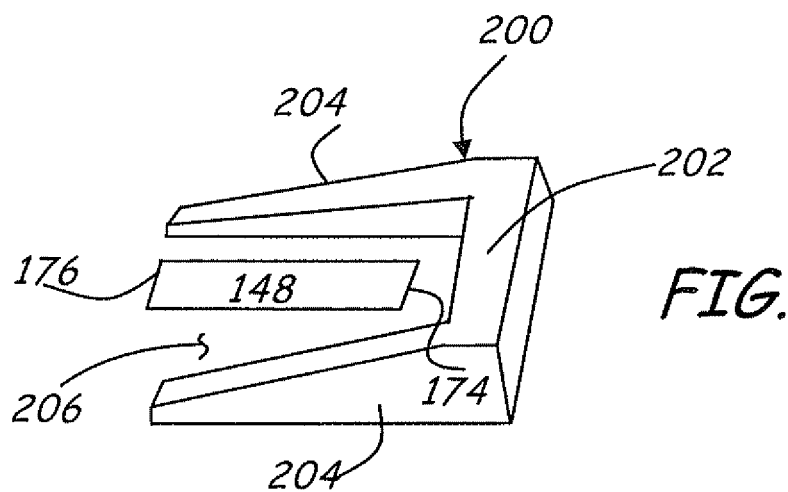
FIGS. 8D-8G schematically illustrate embodiments of a pole tip shield having a variable geometry to shape the magnetic wall angle of the pole tip according to an embodiment.

Although in the illustrated embodiments of FIGS. 8A-8B stepped thickness segments 220-1, 220-2, 220-3 are shown, application is not limited to an embodiment having the discrete stepped segments as shown. In illustrated embodiments, the pole tip shield 200 can employ different geometries to vary the magnetic moment along a length of the side portions 204 of the shield 200 to configure the shape of the magnetically induced wall angle to optimize the magnetic field profile. For example, in the embodiment illustrated in FIG. 8D, the side portions 204 have a sloped thickness dimension. As shown, the sloped thickness dimension provides a larger thickness dimension at the leading edge and a smaller thickness dimension proximate to the trailing edge of the side portions 204 of the "U" shaped shield 200 of FIG. 8D. The side portions 204 can have a co-planar surface along the air bearing surface 147 or a sloped contour along the air bearing surface 147 to form the sloped thickness dimension.

Figure 8E:
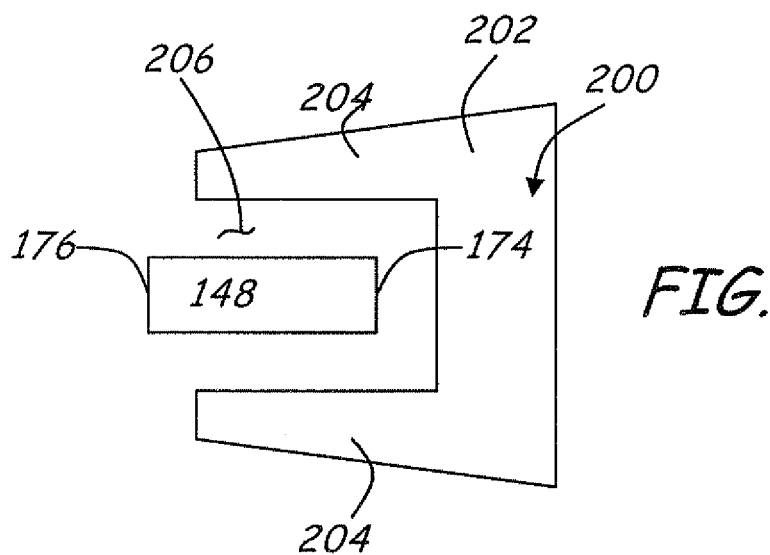
Figure 8F:
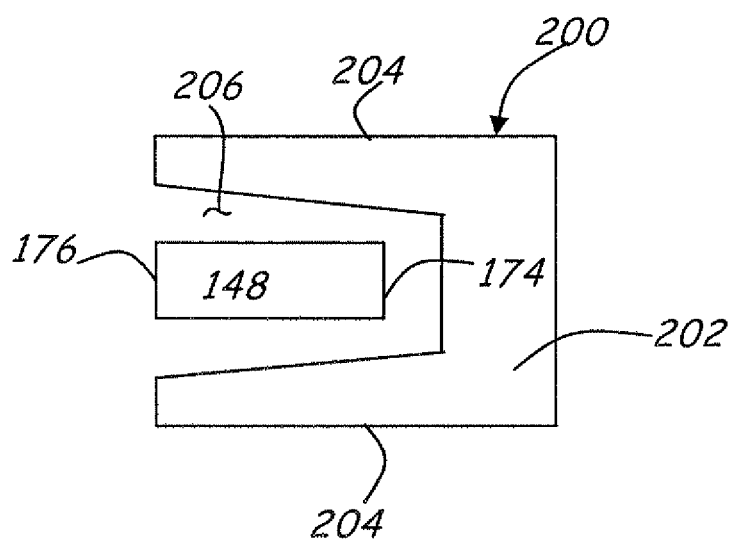
Figure 8G:
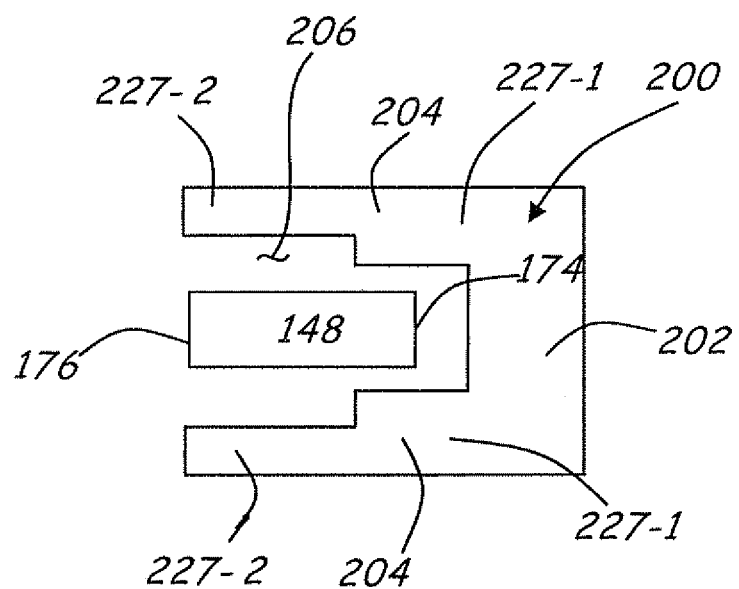

In alternate embodiments shown in FIGS. 8E and 8F, the side portions 204 of the "U" shaped shield 200 include a tapered width profile. In another embodiment illustrated in FIG. 8G, the "U" shaped shield 200 includes a plurality of stepped width segments 227-1, 227-2 having stepped width dimensions to provide different magnetic moments to shape the angle or dimension of the magnetic wall angle as previously described. In particular, as shown width segments 227-1 has a larger dimension than width segment 227-2 to provide a narrower field profile proximate to the leading edge 174 of the pole tip 148.

Figure 9A:
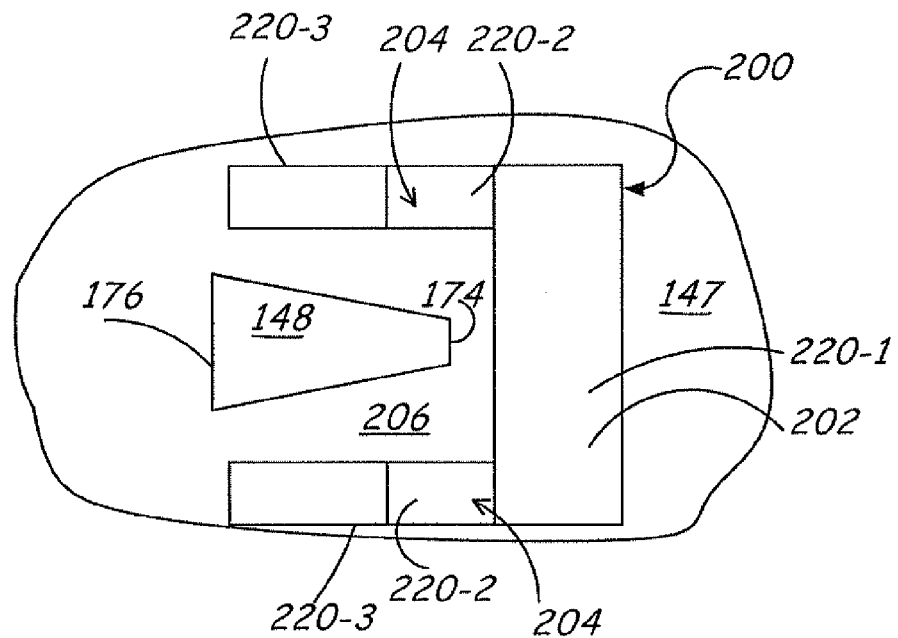
FIGS. 9A-9B schematically illustrate embodiments of a pole tip shield for a pole tip of a write element having stepped thickness segments and a contoured pole tip according to an embodiment.
Figure 9B:
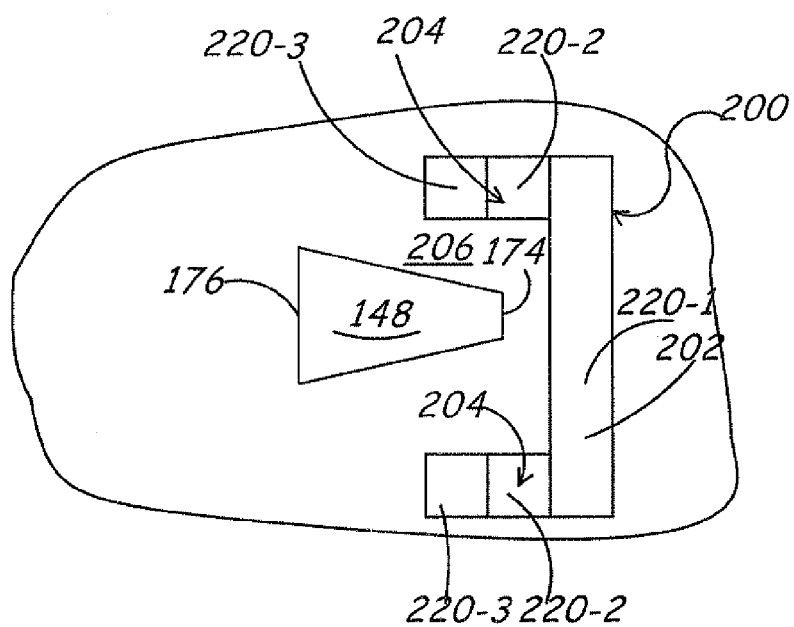

FIGS. 9A-9B illustrate an alternate embodiment of a write element. In the embodiment shown in FIG. 9A, the write element includes pole tip shield 200 including a leading edge shield portion 202 and side shield portions 204. In the embodiment illustrated in FIG. 9A, the length of the side shield portions 204 extends along a length of the sides of the pole tip 148 generally from the leading edge 174 to the trailing edge 176 of the pole tip 148. In the illustrated embodiment, the pole tip 148 is shaped or contoured to provide a narrower width dimension at the leading edge 174 and wider width dimension proximate to the trailing edge 176 to enhance the magnetic field profile in combination with the pole tip shield 200. For example, in an illustrative embodiment, the pole tip 148 is contoured to provide a 4-5 degree physical wall angle and the combination of the pole tip contour and pole tip shield 200 (with stepped portions 220-1, 220-2, 220-3 as shown) are designed to provide an effective wall angle of 10+ degrees.

In another embodiment illustrated in FIG. 9B, the side portions 204 of the pole tip shield 200 have a shortened length dimension, smaller than a length dimension of the sides of the pole tip 148 between the leading and trailing edges 174, 176 of the pole tip 148. In each of the illustrated embodiments of FIGS. 9A-9B, the pole tip shields 200 include stepped thickness segments 220-1, 220-2 and 220-3 as previously described with respect to FIGS. 8A-8B. Alternatively, other embodiments, the "U" shaped pole tip shield previously described herein are utilized in combination with a contoured pole tip as shown in FIGS. 9A-9B.

Figure 10A:
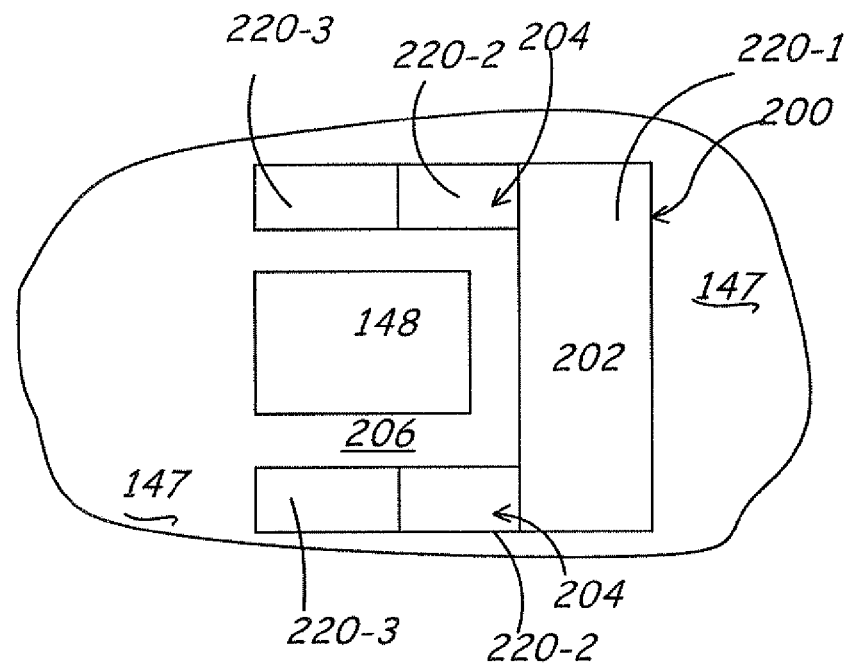
FIG. 10A-10B schematically illustrate embodiments of a write element including a pole tip shield according to an embodiment.
Figure 10B:
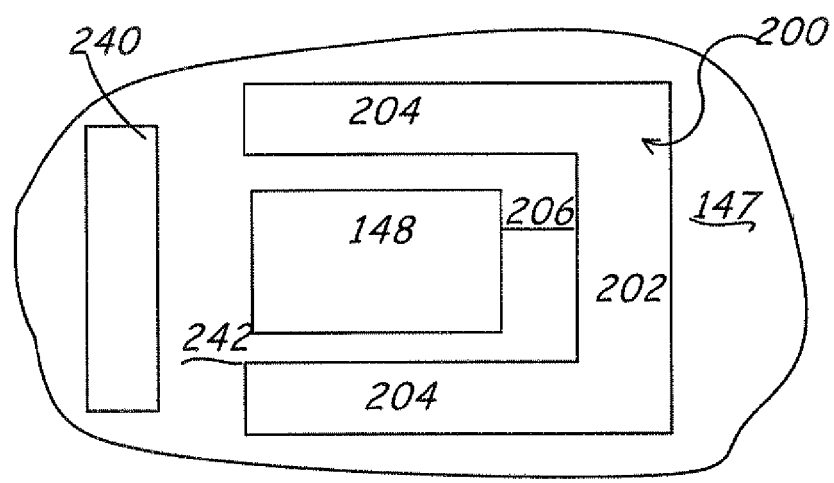

FIGS. 10A and 10B illustrate embodiments of a write element including a pole tip shield 200. In FIG. 10A the pole tip shield 200 includes a plurality of segments 220-1, 220-2, 220-3 having a different magnetic moment to provide a graded pole tip shield. As previously described, in one illustrated embodiment, the segments 220-1, 220-2, 220-3 have different thickness dimensions to form stepped thickness segments 220-1, 220-2, 220-3 as shown and previously described to provide the variable magnetic moment in the down-track direction. Alternatively the segments 220-1, 220-2, 220-3 of materials having a different magnetic moment to provide the variable magnetic moment.

In the embodiment illustrated in FIG. 10B, the write element includes a trailing edge shield 240 separate from the pole tip shield 200. As shown, the trailing edge shield 240 is spaced from the pole tip shield 200 to form a gap 242 between the pole tip shield 200 and the trailing edge shield 240 along the air bearing surface 147 of the head 106. The gap 242 between the pole tip shield 200 and trailing edge shield 240 along the air bearing surface 147 is filled with a non-magnetic material, such as Alumina. In the embodiment illustrated in FIG. 10A, the pole tip shield 200 has different thickness dimensions in contrast to the pole tip shield 200 illustrated in FIG. 10B. In another embodiment, the pole tip shield 200 of FIG. 10B can include stepped thickness segments 220-1, 220-2, 220-3 as shown in FIG. 10A.

FIGS. 11A-11E illustrate embodiments of write elements including a pole tip shield 200. In the illustrated embodiments shown in FIGS. 11B-11E, the write element includes a trailing edge shield 240 separated from and spaced from the pole tip shield 200 along the air bearing surface 147 of the head 106. In each of the illustrated embodiments, for example, the pole tip shield 200 is magnetically connected to an auxiliary pole 142 to provide a flux connection between the pole tip shield 200 and the auxiliary pole 142 as previously illustrated in FIG. 3B or 3C. The auxiliary pole 142 provides a flux path for magnetic charge from the shield 200 to enhance the magnetic wall angle of the pole tip 148.

Figure 11A:
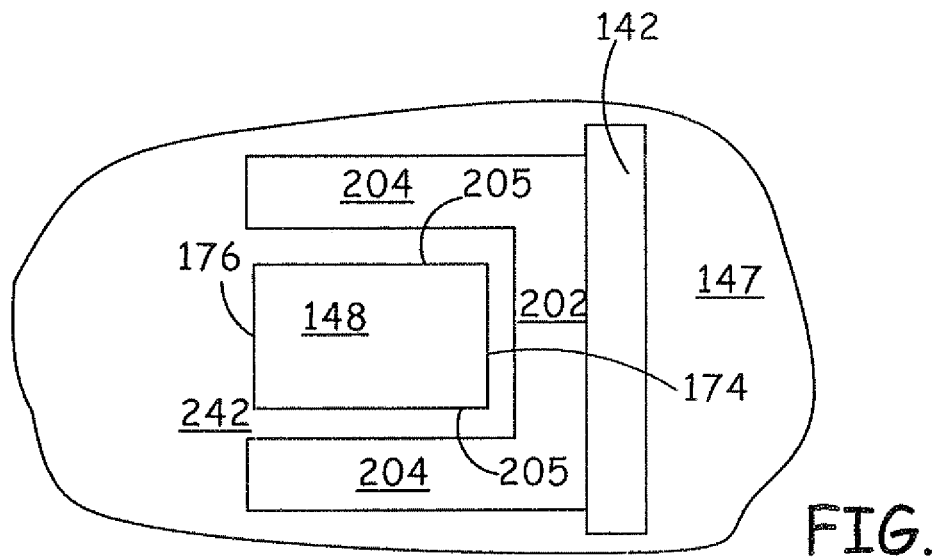
FIGS. 11A-11E schematically illustrate embodiments of a write element including a pole tip shield magnetically connected to an auxiliary pole according to an embodiment.
Figure 11B:
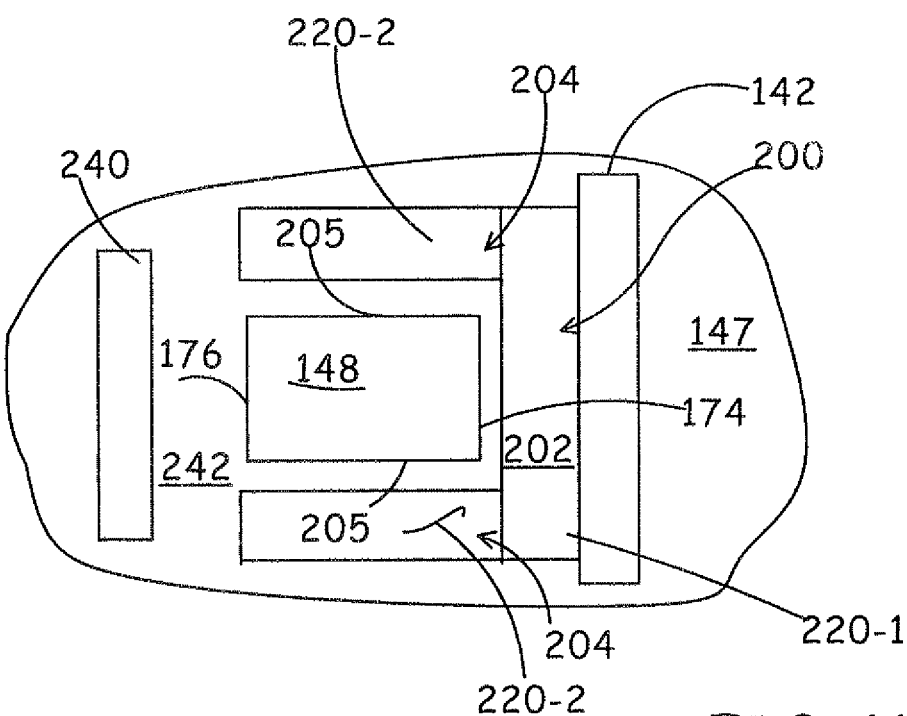
Figure 11C:
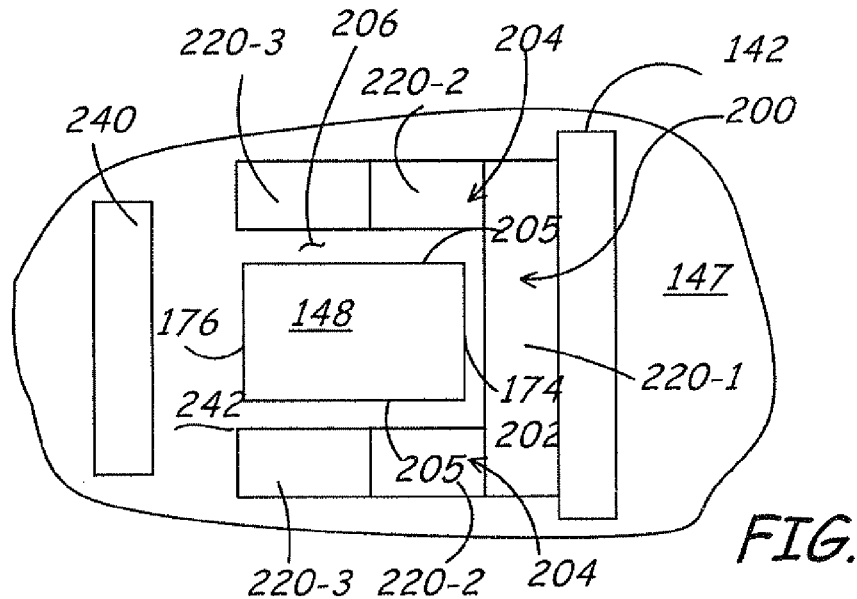

In the illustrated embodiments of FIGS. 11A-11C the pole tip shield 200 includes a leading edge portion 202 and side portions 204. In FIGS. 11A-11C, the side portions 204 have an elongated length extending along the sides 205 of the pole tip 148 generally from the leading edge 174 to the trailing edge 176 of the pole tip 148. In the embodiment illustrated in FIG. 11B, the leading edge portion 202 and side portions 204 include stepped thickness segments 220-1, 220-2 to provide different thickness dimensions of the shield 200. In the embodiment illustrated in FIG. 11C, the shield 200 includes stepped thickness segments 220-1, 220-2, 220-3 to form the different thickness dimensions of the shield 200. In each of the embodiments shown in FIGS. 11A-11C, the write element could include a trailing edge shield as in FIGS. 11B-11C or not include a trailing edge shield 240 as in FIG. 11A. Illustratively the thickness of the trailing edge shield 240 is similar to the thickness of the leading edge portion of the pole tip shield 200. In illustrated embodiments, auxiliary pole 142 is connected to the pole tip shield 200 to enhance magnetic wall angle. In an exemplary embodiment having a trailing edge shield 240, auxiliary pole 142 can be connected to the trailing edge shield 240.

Figure 11D:
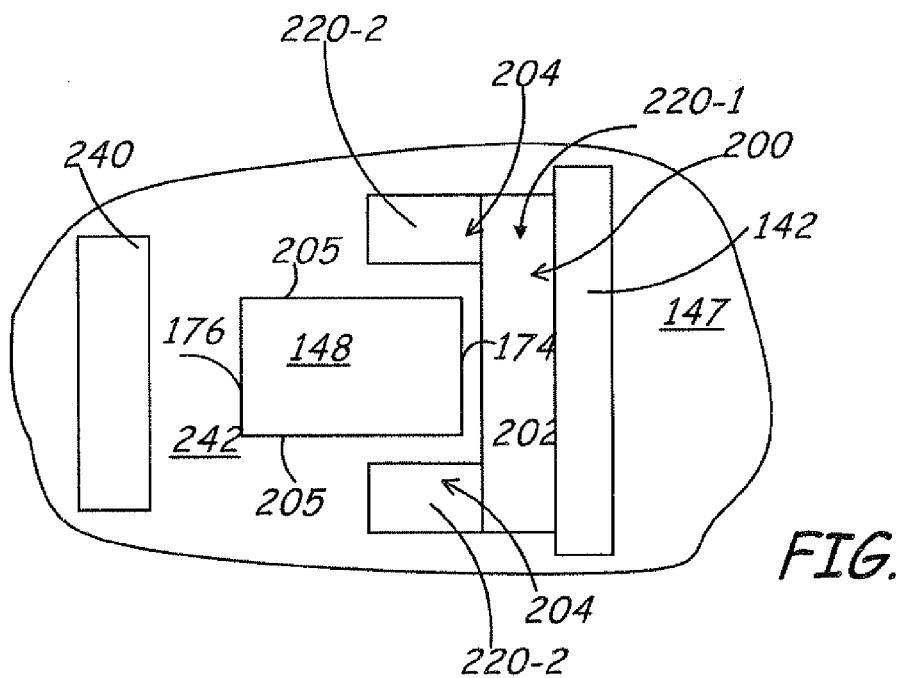
Figure 11E:
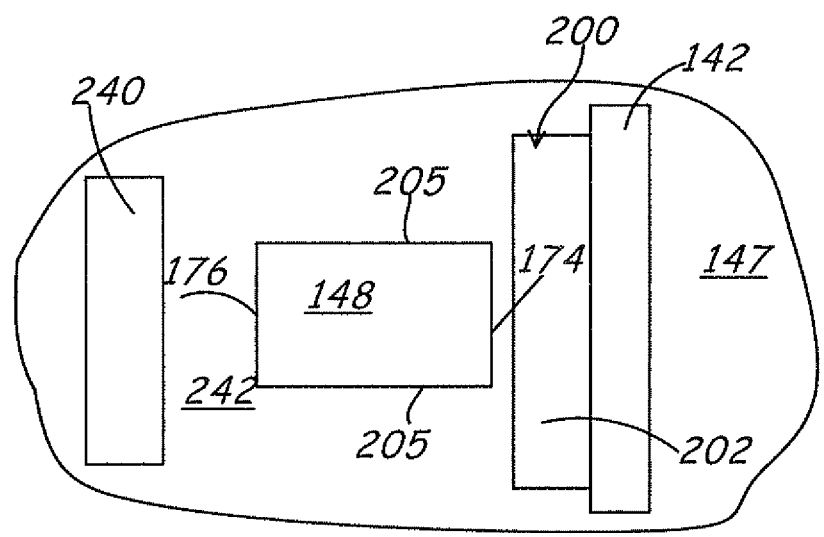

In FIG. 11D, the pole tip shield 200 includes a leading edge portion 202 and shortened side portions 204. In the illustrated embodiment, the leading edge portion 202 and side portions 204 include different thickness dimensions formed by the stepped thickness segments 220-1, 220-2 similar to embodiments previously described. FIG. 11E illustrates an embodiment of a pole tip shield 200 coupled to the auxiliary pole 142 and a trailing edge shield 240 separated from and spaced from the pole tip shield 200 along the air bearing surface 147. As shown, the pole tip shield 200 includes a leading edge portion 202 spaced forward of the leading edge of the pole tip to provide a magnetic field profile for writing. In each of the illustrated embodiments, alternate features can be employed as described herein to shape the magnetic profile or wall angle of the write element of the head.

Figure 12A:
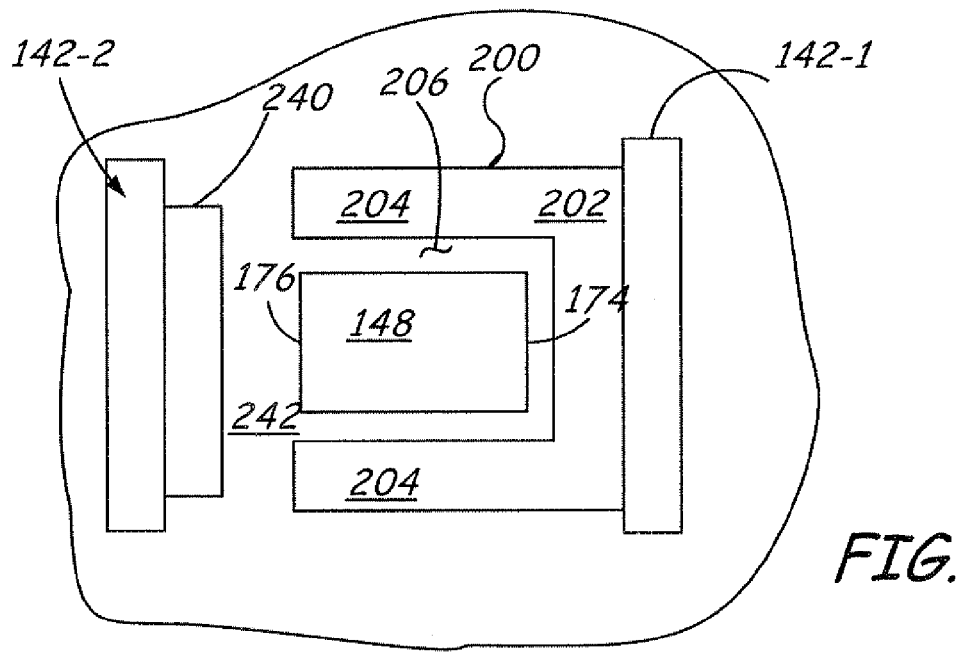
FIGS. 12A-12B schematically illustrate embodiments of a write element including a pole tip shield magnetically connected to a first auxiliary pole and a leading edge shield spaced from the pole tip shield and magnetically connected to a second auxiliary pole according to an embodiment.
Figure 12B:
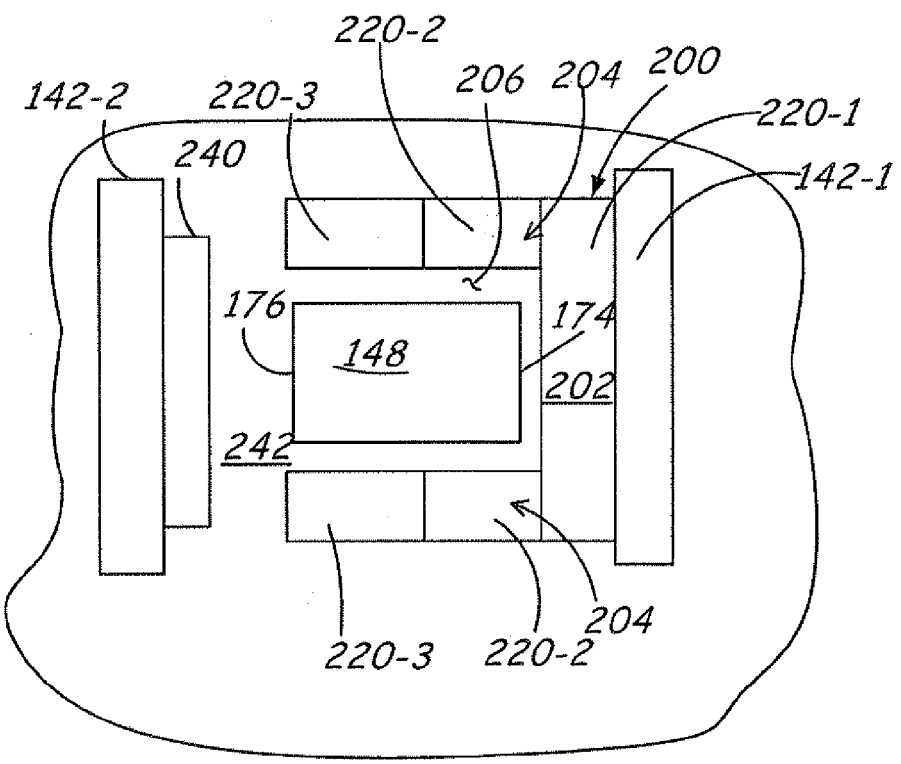

FIGS. 12A-12B illustrate embodiments of write elements that include auxiliary poles 142-1, 142-2 connected to the main pole via yokes as previously illustrated in FIG. 3C. Each of the illustrated embodiments in FIGS. 12A and 12B includes a pole tip shield 200 and a trailing edge shield 240. In the illustrated embodiments in FIGS. 12A-12B, the pole tip shield 200 includes a leading edge portion 202 and side portions 204. The shield is magnetically connected to the first auxiliary pole 142-1 forward of the leading edge of the pole tip 148. The trailing edge shield 240 is spaced from the pole tip shield 200 and is magnetically coupled to the second auxiliary pole 142-2 aft of the pole tip 148. As shown, the pole tip shield 200 and trailing edge shield 240 are separated via a non-magnetic gap 242 along the air bearing surface 147 and are magnetically connected through connection of the auxiliary poles 142-1, 142-2 to main pole 140 as previously illustrated in FIG. 3C. In the embodiment illustrated in FIG. 12B, the pole tip shield 200 includes stepped thickness segments 220-1, 220-2, 220-3 as previously described in relation to other embodiments disclosed in the application, although other applications can utilize alternate features described herein.

Figure 13A:
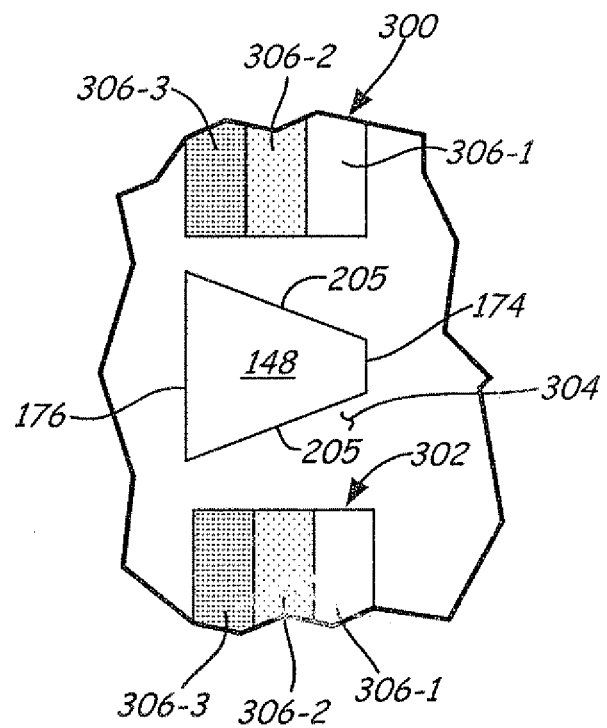
FIG. 13A is a plan view schematically illustrating an embodiment of graded side shield portions spaced from and extending along sides of the pole tip of a write element according to an embodiment.

In another embodiment schematically shown in FIG. 13A, graded side shield portions 300, 302 are configured to shape the magnetic profile or write field. As shown, the graded side shield portions 300, 302 extend along a length of sides 205 of the pole tip 148. In the illustrated embodiment, the graded side shield portions 300, 302 are fabricated of a graded magnetic moment material providing a variable magnetic permeability or magnetic flux along a length of the side shield portions 300, 302.

In particular, the side shield portions 300, 302 are formed of a magnetic alloy. As previously described, the composition of the magnetic alloy is varied along the length of the side shield portions 300, 302 by varying the percentage of the alloy elements to provide the graded magnetic moment material. For example, in illustrative embodiments, the side shield portions 300, 302 are formed of a cobalt iron $Co_xFe_y$, iron nickel $Fe_yNi_x$ cobalt iron nickel $Co_xFe_yNi_z$ or other ferromagnetic alloy materials and the percentages of x, y, and/or z of one or more of the alloy elements is varied along the length of the side shield portions 300, 302 to provide the graded magnetic moment material having a graded saturation magnetization Ms.

In the embodiment shown in FIG. 13A, side shield portions 300, 302 extend generally along the length of the pole tip 148 between the leading edge 174 and the trailing edge 176 of the pole tip 148. The side shield portions 300, 302 are spaced from the sides 205 of the pole tip 148 to form gap region 304. The gap region 304 is filled with an insulating material such as Alumina as described with respect to previous embodiments.

The side shield portions 300, 302 are fabricated so that a leading edge portion of the side shields 300, 302 is fabricated of a higher magnetic moment material and a magnitude of the magnetic moment of the material decreases in the down track direction from the higher magnetic moment material proximate to the leading edge 174 of the pole tip 148 to a lower magnetic moment material proximate to the trailing edge 176 of the pole tip 148. The graded magnetic moment material reduces the magnitude of flux shunted from the pole tip 148 to the side shield portions 300, 302. This limits loss of the magnetic field gradient proximate to the trailing edge 176 of the pole tip 148. The graded side shield portions 300, 302 also reduce fringe flux from the media, which reduces ATI. In an illustrated embodiment, the side shield portions 300, 302 include discrete graded segments 306-1, 306-2, 306-3 of decreasing magnetic moment material, however, application is not limited to a particular number or arrangement of discrete segments and the alloy material can vary continuously along the side shield portions 300, 302 to optimize the magnetic properties and contour of the write bubble 210 as shown in FIG. 7.

Figure 13B:
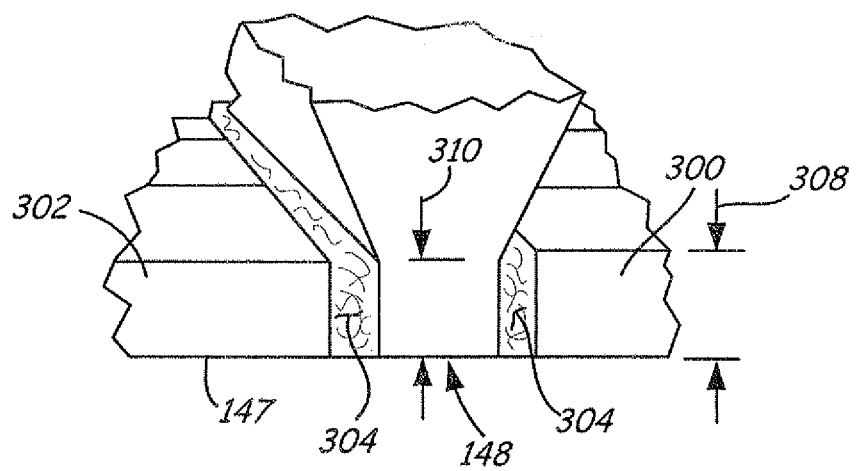
FIG. 13B is a perspective view schematically illustrating an embodiment of the graded side shield portions illustrated in FIG. 13A according to an embodiment.

In the embodiment illustrated in FIG. 13B, the side shield portions 300, 302 have a generally uniform height dimension 308. As shown, the uniform height of the side shield portions 300, 302 generally corresponds to a throat height 310 of the pole tip 148. As described, with respect to FIGS. 13A-13B, the composition of the magnetic material varies along the length of the side shield portions 300, 302 to provide a variable magnetic moment that decreases in the down track direction without varying the height or other dimensions of the side shield portions 300, 302. In alternate embodiments, the side shield portions 300, 302 extend from a leading edge portion as described in alternate embodiments disclosed in the application.

Figure 14A:
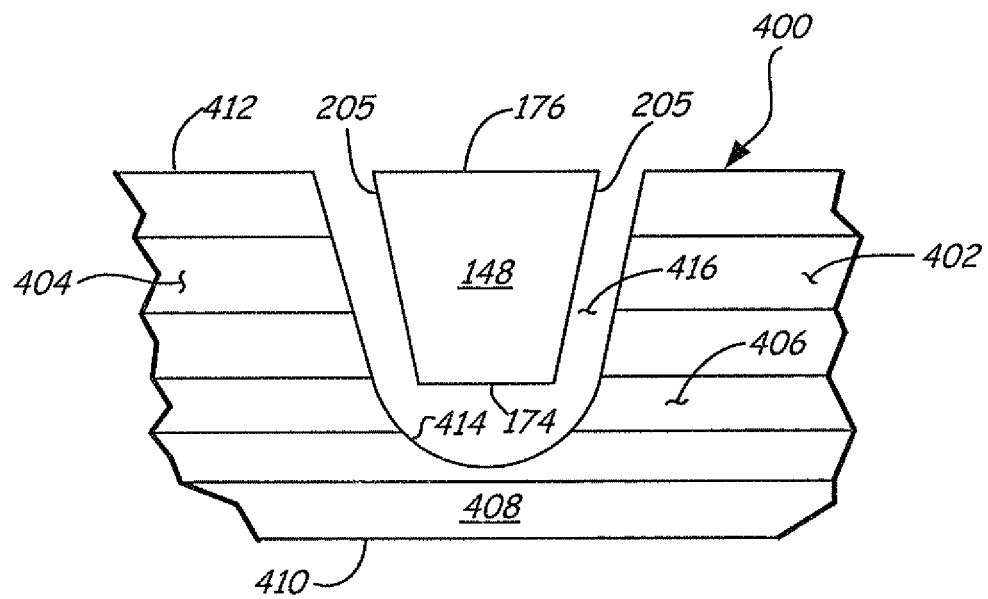
FIG. 14A schematically illustrates an embodiment of a pole tip shield having graded side shield portions as shown in FIGS. 13A-13B according to an embodiment.

FIG. 14A illustrates an embodiment of a pole tip shield 400 having graded side shield portions 402, 404. In the illustrated embodiment shown in FIG. 14A, the pole tip shield 400 includes a body 406 fabricated of a magnetic alloy material. As shown, in FIG. 14A, the body 406 is shaped to form a leading edge portion 408 and the side shield portions 402, 404 extending along sides 205 of the pole tip 148. As shown, the body 406 includes a leading edge 410 and a trailing edge 412. The trailing edge 412 includes a contoured profile, which as shown, forms an indented portion 414 defining the leading edge portion 408 spaced from the leading edge 174 of the pole tip and the side shield portions 402, 404 on opposed sides of the pole tip 148.

The body 406 of the pole tip shield 400 is spaced from the pole tip to form a gap region (or pole-shield gap region) 416 between the leading edge portion 408 and the pole tip 148 and the side shield portions 402, 404 and the pole tip 148. An insulating material is formed in the gap region 416 between the pole tip shield 400 and the pole tip 148. As shown, the indented portion 414 includes a rounded indented surface contour to provide a rounded profile for the insulated gap region 416 forward of the pole tip. The rounded profile proximate to the leading edge of the pole tip 148 limits fringe leakage.

The body 406 of the pole tip shield 400 illustrated in FIG. 14A is fabricated of a graded magnetic moment material to provide a higher magnetic moment proximate to the leading edge and a decreasing magnetic moment along the side shield portions 402, 404. The composition or percentage of the alloy elements of the pole tip shield 400 are varied to provide the decreasing magnetic moment in the down-track direction as previously described.

Figure 14B:
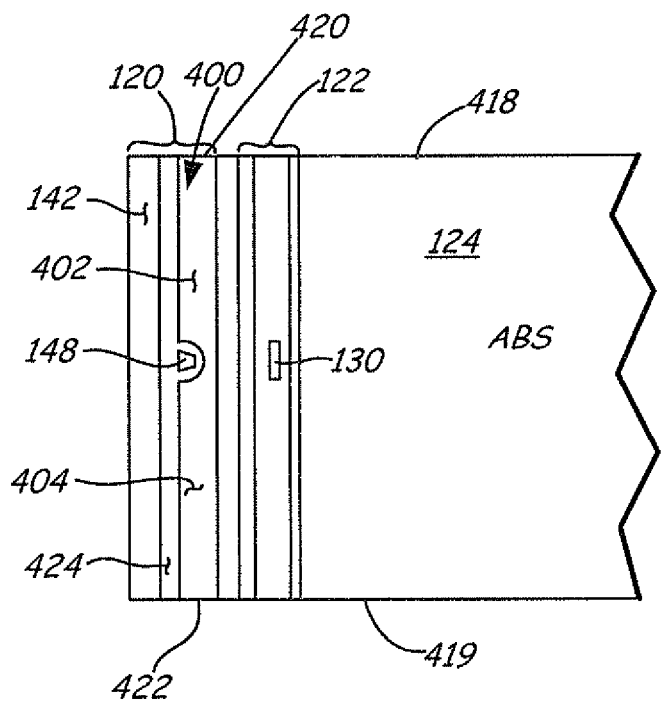
FIG. 14B is a plan view illustrating an embodiment of a head having a pole tip shield with graded side shield portions according to an embodiment.

FIG. 14B illustrates an embodiment of a graded pole tip shield 400 similar to that shown in FIG. 14A. In the embodiment illustrated in FIG. 14B, a width dimension of the body 406 in the cross-track direction extends between opposed side edges 418, 419 of the substrate or slider body 124. In particular, in the illustrated embodiment shown in FIG. 14B, the body 406 of the pole tip shield includes perimeter edges 420, 422 and a cross-width between the perimeter edges 420, 422 extends the entire cross-width dimension of the head or slider body 124. As shown in FIG. 14B, a trailing edge gap region 424 extends from the trailing edge of the pole tip shield to return pole 142 down-track from pole tip 148 and is filled with a magnetically insulating material.

Figure 14C:
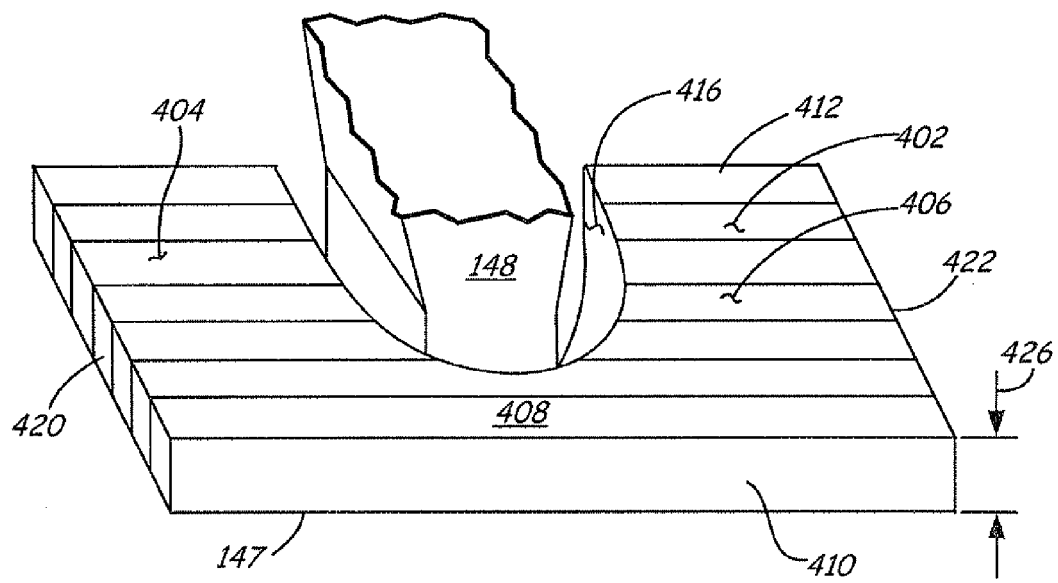
FIG. 14C is a perspective illustration of an embodiment of a pole tip shield having graded side shield portions according to an embodiment.

In the embodiment shown in FIG. 14C, the body 406 of the pole tip shield 400 has a uniform body height 426 in the down-track direction between the leading edge 410 and the trailing edge 412 of the pole tip shield 400 and a uniform height 426 in the cross-track direction between the opposed perimeter edges 420, 422. In an illustrative embodiment, the uniform height 426 of the pole tip shield corresponds to the throat height 310 of the pole tip 148.

Figure 14D:
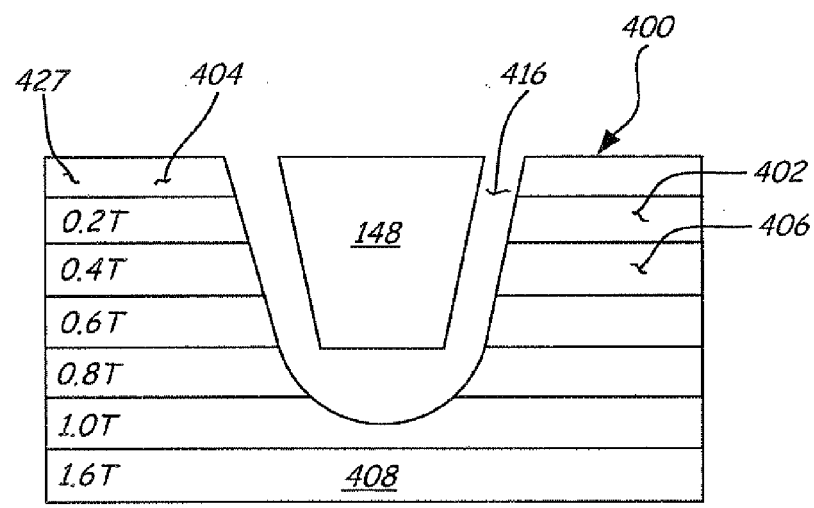
FIG. 14D is a plan view illustrating one embodiment of a pole tip shield having graded side shield portions including a plurality of graded segments according to an embodiment.

FIG. 14D illustrates an embodiment of the graded pole tip shield 400 having graded side shield portions 402, 404 as illustrated in FIGS. 14A-14C. In an embodiment shown in FIG. 14D, the pole tip shield 400 includes discrete graded segments, which provide a decreasing magnetic moment in the down-track direction. In FIG. 14D, the discrete magnetic moment segments from the leading edge 410 to the trailing edge 412 include a first segment having a magnetic field or moment of 1.6 Tesla, a second segment having a magnetic field or moment of 1.0 Tesla, a third segment having a magnetic field or moment of 0.8 Tesla, a fourth segment having a magnetic field or moment of 0.6 Tesla, a fifth segment having a magnetic field or moment of 0.4 Tesla, a six segment having a magnetic field or moment of 0.2 Tesla. In the illustrated embodiment, end segment 427 of the side shield portions 402, 404 is formed of a magnetically insulated segment.

Figure 14E:
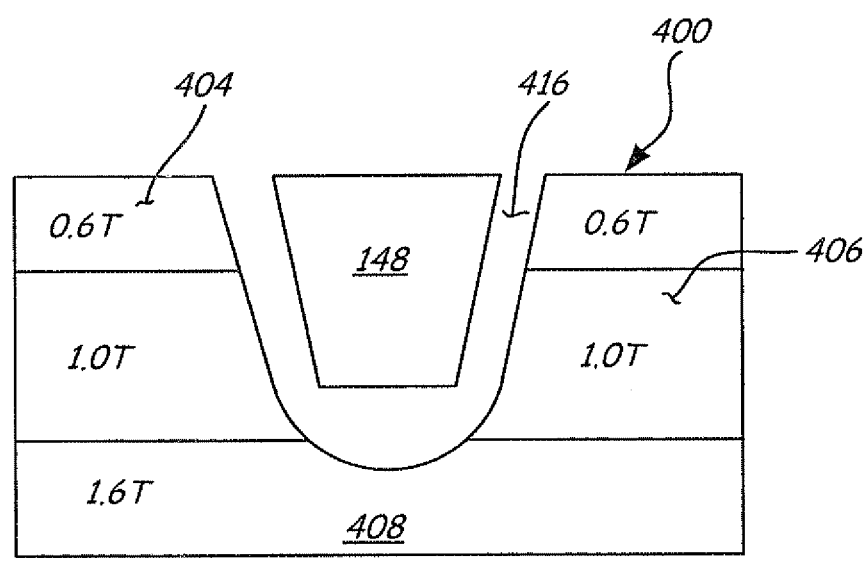
FIG. 14E is a plan view illustrating another embodiment of a pole tip shield having graded side shield portions including a plurality of graded segments according to an embodiment.

FIG. 14E illustrates another embodiment of the graded pole tip shield 400 having graded side shield portions 402, 404 having discrete graded segments as described. In the illustrated embodiment of FIG. 14E, the discrete magnetic moment segments from the leading edge 410 to the trailing edge to the trailing edge 412 include a first segment having a magnetic field or moment of 1.6 Tesla, a second segment having a magnetic field or moment of 1.0 Tesla, a third segment having a magnetic field or moment of 0.6 Tesla.

Although FIG. 14D illustrates a particular pattern or arrangement for the graded pole tip shield, application is not limited to the specific graded segments or number of graded segments disclosed. In particular the magnetic properties of the pole tip shield or side shield portions can be modeled to optimize the write field gradient or contour of the write field as will be appreciated by those skilled in the art. In each of the illustrated embodiments shown in FIGS. 14A-14D, the pole tip 148 is generally trapezoidal shaped to provide a narrow width dimension at the leading edge or physical wall angle to reduce ATI.

Figure 15A:
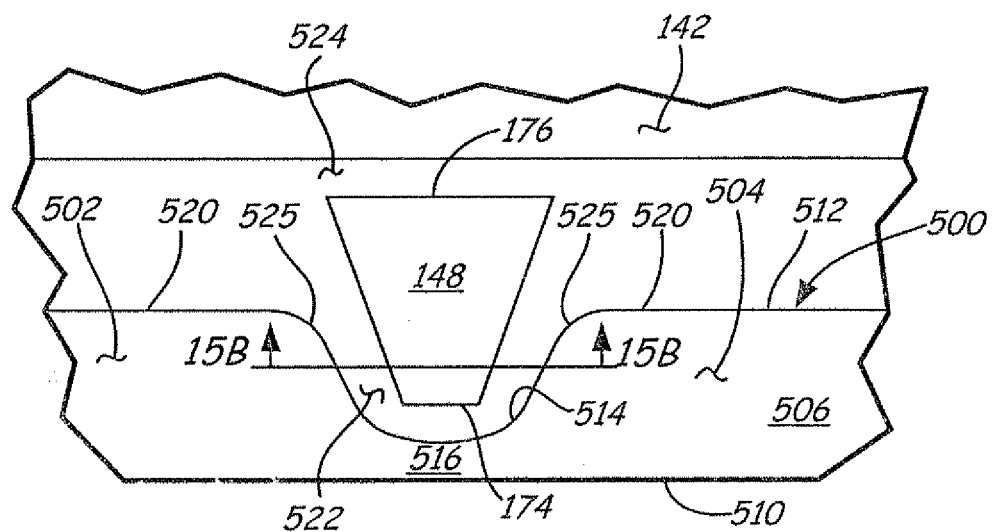
FIG. 15A is a plan view schematically illustrating a pole tip shield having shortened side shield portions according to an embodiment.
Figure 15B:
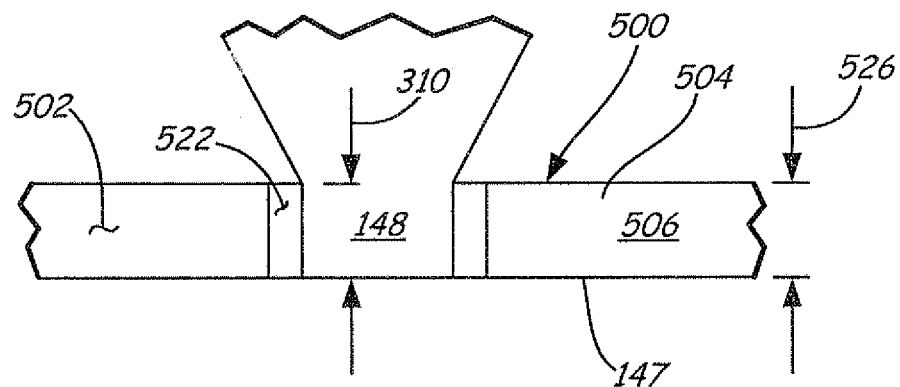
FIG. 15B is a cross-sectional view of the pole tip and pole tip shield taken along line 15B-15B of FIG. 15A according to an embodiment.
Figure 15C:
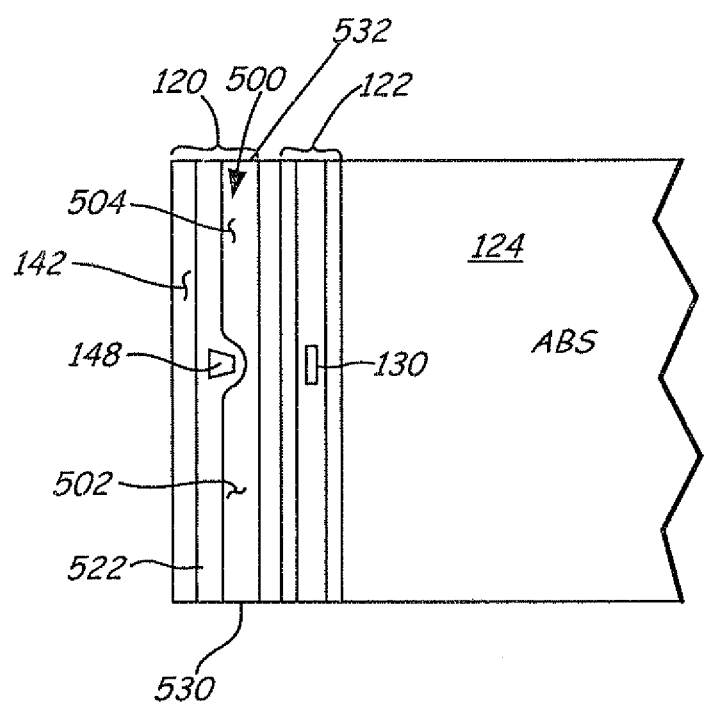
FIG. 15C is a plan view of an embodiment of a head including a pole tip shield having shortened side shield portions according to an embodiment.

FIGS. 15A-15C illustrate embodiments of a pole tip shield 500 which utilize shorted side shield portions 502, 504 to provide a narrow write bubble contour at the leading edge and optimum write field gradient. The shortened length of the shorted side shield portions 502, 504 reduces flux or field gradient loss as discussed above. As shown in FIG. 15A, the pole tip shield includes a body 506 fabricated of a magnetic material. As shown the body 506 includes a leading edge 510 and a trailing edge 512. The trailing edge 512 includes a contoured profile having an indented portion 514 to form a leading edge portion 516 forward of the leading edge 174 of the pole tip 148 and the shorted side shield portions 502, 504 extending along sides of the pole tip 148 in the down-track direction. As described, the shorted side portions 502, 504 extend along a partial length of the pole tip 148 to form terminal edge surfaces 520 extending in the cross-track direction terminating forward of the trailing edge 176 of the pole tip 148.

In the embodiment shown, the indented portion 514 is spaced from the pole tip 148 to form a gap region 522 between the pole tip shield 500 and the pole tip 148. As shown, the write element also includes an insulated region 524 down-track from the terminal edge surface 520 of the shorted side shield portions 502, 504 toward the trailing edge 176 of the pole tip 148. In the illustrated embodiment, the insulated region 524 extends from the terminal edge surfaces 520 to return pole 142. Each of the gap 522 and insulated region 524 is formed of an insulating material such as Alumina.

As shown in FIG. 15A, the indented portion 514 includes a rounded indented surface contour to provide a rounded profile forward of the leading edge 174 of the pole tip. The pole tip shield 500 also includes rounded edge surfaces 525 between the indented portion 514 and the terminal edge surfaces 520 of the shorted side shield portions 502, 504. The rounded profile proximate to the leading edge 174 of the pole tip tends to limit fringe leakage. In the illustrated embodiment the insulated region 524 restricts magnetic flux flow to reduce field gradient loss as previously described with respect to other embodiments.

In the embodiment shown in FIG. 15B, the body 506 of the pole tip shield 500 includes a height dimension 526 orientated generally perpendicular to the media. In the embodiment shown, the body of the pole tip shield has a uniform height 526 in the down-track direction between the leading edge 510 and the trailing edge 512 of the pole tip shield and a uniform height 526 in the cross-track direction, which in the illustrated embodiment corresponds to the throat height 310 of the pole tip 148.

FIG. 15C illustrates an embodiment a pole tip shield 500 having shorted side shield portions 502, 504 having a cross width dimension formed between perimeter edges 530, 532. In the illustrated embodiment, the cross width of the pole tip shield 500 between the perimeter edges 530, 532 extends the entire cross-width dimension of the head or slider body 124. Although FIGS. 15A-15C illustrate embodiments of a pole tip shield having shorted side shield portions 502, 504, application is not limited to the particular embodiments shown and the features illustrated in FIGS. 15A-15C can be utilized to form a pole tip shield for different write element configurations.

As described, magnetic flux from the write pole tip is shunted toward the side shield portions enhancing the magnetic wall angle of the pole tip 148. However, the shunted flux tends to reduce the write field amplitude and field gradient. Also, the shunted flux can change the magnetic domain patterns in the shield and generate erasure field in the recording layer resulting in large bit error rate degradation. The shortened length of the side shield portions or graded side shield portions of the illustrated embodiments reduces field gradient loss and limits side shield erasure of the pole tip shield, which can degrade write performance of the write element.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the disclosure and/or the appended claims. In addition, although one or more of the embodiments described herein is directed to a particular data storage application, it will be appreciated by those skilled in the art that the teachings disclosed herein can be applied to other data storage applications, without departing from the scope and spirit of the disclosure and/or appended claims.

Additionally, although illustrated embodiments disclosure features arranged in a particular combination, other applications or embodiments can incorporate one or more features described herein and application is not limited to the specific combinations or arrangements shown.

What is claimed is:

1. An assembly comprising:
   a magnetic pole assembly having a coil energizable to induce a magnetic flux in a pole having a pole tip including a leading edge, a trailing edge, a first side edge and a second side edge;
   a first side shield portion coextending along and spaced from the first side edge of the pole tip to form a first gap region between the first side shield portion and the first side edge and a second side shield portion coextending along and spaced from the second side edge of the pole tip to form a second gap region between the second side shield portion and the second side edge of the pole tip wherein, the first and second side shield portions are formed of a graded magnetic moment material to provide a variable magnetic moment along a length of the first and second side shield portions; and
   a magnetically insulating material in the first gap region between the first side shield portion and the first side edge and the second gap region between the second side shield portion and the second side edge.

2. The assembly of claim 1 wherein the magnetic moment of the graded magnetic moment material decreases in a down-track direction to provide a larger magnetic moment for the first and second side shield portions proximate to the leading edge of the pole tip relative to the trailing edge of the pole tip.

3. The assembly of claim 2 wherein the first and second side shield portions include a plurality of graded segments wherein the magnetic moment of the graded segments decreases in the down-track direction towards the trailing edge of the pole tip.

4. The assembly of claim 1 wherein a height and width dimension of the first and second side shield portions are the same along the length of the first and second side shield portions between a leading edge and a trailing edge of the first and second side shield portions and the graded magnetic moment material provides the variable magnetic moment along the length of the first and second side shield portions.

5. The assembly of claim 1 wherein the graded magnetic moment material of the first and second side shield portions is formed of a ferromagnetic alloy comprising a plurality of elemental materials and a percentage of one or more of the plurality of elemental materials of the alloy is varied to form the first and second side shield portions.

6. The assembly of claim 5 wherein the plurality of elemental materials include one or more of cobalt, iron and nickel.

7. The assembly of claim 1 comprising a leading edge shield portion spaced forward of the pole tip to form a third gap region between the leading edge shield portion and the leading edge of the pole tip and the assembly including a magnetically insulating material in the third gap region between the leading edge shield portion and the leading edge of the pole tip wherein, the leading edge shield portion has a higher magnetic moment than the first and second side shield portions and the magnetic moment decreases in a down-track direction along a length of the first and second side shield portions.

8. The assembly of claim 7 wherein the magnetic pole assembly is formed on a slider body and a width of the first side shield portion extends from the first gap region between the first side shield portion and the first side edge of the pole tip to a first side of the slider body and a width of the second side shield portion extends from the second gap region between the second side shield portion and the second side edge to a second side of the slider body.

9. A magnetic assembly comprising:
   a magnetic pole assembly having a coil energizable to induce a magnetic flux path in a pole having a pole tip, wherein the pole tip includes a leading edge, a trailing edge and side edges;
   pole tip shield portions spaced from the side edges of the pole tip to form a pole-shield gap region between the pole tip shield portions and the side edges of the pole tip wherein the pole tip shield portions are formed of a graded magnetic moment material providing a magnetic moment that decreases in a down-track direction to provide a larger magnetic moment for the pole tip shield portions proximate to the leading edge of the pole tip relative to the magnetic moment for the pole tip shield portions proximate to the trailing edge of the pole tip; and
   a magnetically insulating material in the gap region between the pole tip shield portions and the pole tip.

10. The assembly of claim 9 wherein the assembly includes a slider body and the magnetic pole assembly is fabricated proximate to a trailing edge of the slider body and a cross-width of a first pole tip shield portion extends from a first gap region separating the first pole tip shield portion from a first side edge of the pole tip to a first side of the slider body and a cross-width of a second pole tip shield portion extends from a second gap region separating the second pole tip shield portion from a second side edge of the pole tip and a second side of the slider body, wherein the first gap region and the second gap region are a part of the pole-shield gap region.

11. The assembly of claim 9 wherein the pole tip shield portions comprise a leading edge shield portion spaced forward of the leading edge of the pole tip to form a third gap region between the leading edge shield portion and the leading edge of the pole tip and the leading edge shield portion has a rounded indented surface contour forward of the leading edge of the pole tip, wherein the third gap region is a part of the pole-shield gap region.

12. The assembly of claim 9 wherein the pole tip shield portions are formed of a ferromagnetic alloy comprising a plurality of elemental materials and a percentage of at least one of the plurality of elemental materials of the alloy is varied to form the graded magnetic moment material having the magnetic moment that decreases in the down-track direction.

13. The assembly of claim 9 wherein the graded magnetic moment material is formed of one or more of iron, nickel or cobalt elements and a percentage of the one or more of the iron, nickel or cobalt elements is varied to provide the graded magnetic moment material.

14. A magnetic assembly comprising:
   a magnetic pole assembly having a coil energizable to induce a magnetic flux path in a pole including a pole tip having a leading edge, a trailing edge and side edges;
   a pole tip shield formed of a body having a leading edge and a trailing edge, and the trailing edge of the body having an indented portion spaced from the pole tip to form a gap region separating the body of the pole tip shield from the pole tip and the body of the pole tip shield configured to form a leading edge shield portion and side shield portions having a shortened length extending along a partial length of the side edges of the pole tip and the shortened length of the side shield portions forming terminal edge surfaces down-track from the leading edge of the pole tip between the leading and trailing edges of the pole tip;
   a magnetically insulating material in the gap region separating the indented portion of the pole tip shield from the pole tip and the indented portion having a rounded indented surface contour to provide a rounded profile for the gap region forward of the leading edge of the pole tip; and a magnetically insulated region extending down-track from the terminal edge surfaces of the side shield portions towards the trailing edge of the pole tip.

15. The assembly of claim 14 wherein the magnetic pole assembly is fabricated on a slider body and a width of the pole tip shield between perimeter edges of the pole tip shield extends an entire cross-width dimension of the slider body.

16. The assembly of claim 14 wherein the magnetic pole assembly is fabricated on a substrate and a width of the side shield portions extend from the gap region to side edges of the substrate.

17. The assembly of claim 14 wherein the pole tip has a smaller width dimension at the leading edge than the trailing edge of the pole tip to form a wall angle for the pole tip.

18. The assembly of claim 14 wherein the leading edge shield portion and the side shield portions of the pole tip shield have a uniform height dimension in a direction extending away from a media facing surface of the pole tip.

19. The assembly of claim 18 wherein the height dimension of the leading edge shield portion and the side shield portions of the pole tip shield corresponds to a throat height of the pole tip.

20. The assembly of claim 14 comprising a rounded edge surface between the indented portion and the terminal edge surfaces of the shortened side shield portions.

* * * * *